(12) United States Patent
Wu et al.

(10) Patent No.: US 11,543,913 B2
(45) Date of Patent: Jan. 3, 2023

(54) TOUCH PANEL AND TOUCH PANEL OPERATION METHOD THEREOF

(71) Applicant: InnoLux Corporation, Miao-Li County (TW)

(72) Inventors: Yuan-Lin Wu, Miao-Li County (TW); Tsung-Han Tsai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/474,065

(22) Filed: Sep. 14, 2021

(65) Prior Publication Data
US 2022/0137777 A1   May 5, 2022

(30) Foreign Application Priority Data
Oct. 30, 2020   (CN) .......................... 202011190880.5

(51) Int. Cl.
*G06F 3/041*   (2006.01)
*G06F 3/042*   (2006.01)
*G06F 3/045*   (2006.01)
*G06F 3/044*   (2006.01)

(52) U.S. Cl.
CPC .......... *G06F 3/04166* (2019.05); *G06F 3/042* (2013.01); *G06F 3/045* (2013.01); *G06F 3/0446* (2019.05); *G06F 3/04186* (2019.05); *G06F 2203/04102* (2013.01)

(58) Field of Classification Search
CPC .. G06F 3/04166; G06F 3/04186; G06F 3/042; G06F 3/0446; G06F 3/045; G06F 2203/04102
See application file for complete search history.

(56) References Cited

U.S. PATENT DOCUMENTS

| | | | | |
|---|---|---|---|---|
| 4,556,871 | A * | 12/1985 | Yoshikawa | ........ H03K 17/9618 341/26 |
| 6,459,424 | B1 * | 10/2002 | Resman | ................ G06F 3/0488 345/173 |
| 8,842,090 | B1 * | 9/2014 | Cho | .................... G06F 3/04886 345/173 |
| 9,606,654 | B2 * | 3/2017 | Li | ......................... G06F 1/1694 |
| 9,734,779 | B2 * | 8/2017 | Forutanpour | ........... G09F 9/301 |
| D802,554 | S * | 11/2017 | Cho | ...................... D14/138 AD |
| 9,939,900 | B2 * | 4/2018 | Cruz-Hernandez | ........................ G06F 1/1652 |
| 10,013,955 | B2 * | 7/2018 | Oh | ........................ G09G 5/006 |
| 10,054,987 | B2 * | 8/2018 | Jung | ..................... G06F 1/1679 |
| 10,401,903 | B2 * | 9/2019 | Choi | ..................... G06F 3/0446 |
| 10,452,156 | B2 * | 10/2019 | Kang | .................... G06F 3/0488 |

(Continued)

*Primary Examiner* — Benyam Ketema
(74) *Attorney, Agent, or Firm* — Winston Hsu

(57) ABSTRACT

A touch panel and a touch panel operation method are disposed. The touch panel includes an active region and a non-active region in an operating state, and the touch panel includes a plurality of sensing electrodes and a controller. The plurality of sensing electrodes are disposed in the active region and the non-active region. The controller receives an active touch signal from the plurality of sensing electrodes located in the active region and a non-active touch signal from the plurality of the sensing electrodes located in the non-active region. The controller manages the active touch signal and the non-active touch signal, so that only the active touch signal is subjected to a subsequent process.

13 Claims, 13 Drawing Sheets

(56) References Cited

U.S. PATENT DOCUMENTS

| | | | |
|---|---|---|---|
| 10,817,022 B2* | 10/2020 | Cho | G06F 1/1624 |
| 10,977,771 B2* | 4/2021 | Jeong | G06F 1/1652 |
| 11,127,321 B2* | 9/2021 | Klein | G06F 3/04886 |
| 11,216,106 B2* | 1/2022 | Lindblad | G09F 9/301 |
| 11,221,676 B2* | 1/2022 | Song | G06F 3/0346 |
| 2005/0040962 A1* | 2/2005 | Funkhouser | G09F 9/301 340/815.4 |
| 2006/0194619 A1* | 8/2006 | Wilcox | G06F 1/1601 455/566 |
| 2007/0205997 A1* | 9/2007 | Lieshout | G09F 9/301 345/204 |
| 2008/0180399 A1* | 7/2008 | Cheng | G06F 3/045 345/173 |
| 2008/0303782 A1* | 12/2008 | Grant | G06F 3/016 345/173 |
| 2009/0225047 A1* | 9/2009 | Lee | G02F 1/13338 345/173 |
| 2010/0056223 A1* | 3/2010 | Choi | G06F 1/1652 455/566 |
| 2010/0060548 A1* | 3/2010 | Choi | G06F 1/1652 345/1.3 |
| 2010/0117975 A1* | 5/2010 | Cho | G06F 3/0202 345/173 |
| 2010/0120470 A1* | 5/2010 | Kim | G06F 3/04883 715/830 |
| 2010/0141605 A1* | 6/2010 | Kang | G06F 3/0487 345/174 |
| 2011/0134073 A1* | 6/2011 | Ahn | G06F 3/0446 345/174 |
| 2011/0141040 A1* | 6/2011 | Kang | G06F 3/0446 345/173 |
| 2011/0227822 A1* | 9/2011 | Shai | G06F 1/169 345/156 |
| 2012/0038613 A1* | 2/2012 | Choi | G09G 3/20 345/211 |
| 2013/0100053 A1* | 4/2013 | Kang | G06F 3/0445 345/173 |
| 2013/0154971 A1* | 6/2013 | Kang | G06F 1/1652 345/173 |
| 2013/0155052 A1* | 6/2013 | Ko | H04N 13/305 345/419 |
| 2013/0215035 A1* | 8/2013 | Guard | G06F 3/0445 345/173 |
| 2013/0265221 A1* | 10/2013 | Lee | H04N 21/4222 345/156 |
| 2013/0265257 A1* | 10/2013 | Jung | G06F 3/038 345/173 |
| 2013/0265260 A1* | 10/2013 | Seo | G06F 3/0488 345/173 |
| 2013/0265262 A1* | 10/2013 | Jung | G06F 3/0488 345/173 |
| 2013/0285922 A1* | 10/2013 | Alberth, Jr. | G06F 3/04883 345/173 |
| 2013/0307816 A1* | 11/2013 | Lee | G06F 1/1684 345/173 |
| 2013/0321264 A1* | 12/2013 | Park | G06F 3/01 345/156 |
| 2014/0009419 A1* | 1/2014 | Kim | G06F 3/0412 345/173 |
| 2014/0015743 A1* | 1/2014 | Seo | G06F 1/3262 345/156 |
| 2014/0028596 A1* | 1/2014 | Seo | G06F 3/0487 345/173 |
| 2014/0049464 A1* | 2/2014 | Kwak | G06F 3/017 345/156 |
| 2014/0054438 A1* | 2/2014 | Yun | F16M 13/005 248/550 |
| 2014/0065326 A1* | 3/2014 | Lee | G06F 1/1652 428/12 |
| 2014/0198036 A1* | 7/2014 | Kim | G06F 3/041 345/156 |
| 2014/0361980 A1* | 12/2014 | Iwaki | G06F 1/1615 345/156 |
| 2015/0169091 A1* | 6/2015 | Ho | G06F 3/0416 345/173 |
| 2015/0220119 A1* | 8/2015 | Seo | G09G 5/37 345/173 |
| 2015/0227248 A1* | 8/2015 | Yamazaki | G06F 1/1641 361/679.01 |
| 2015/0242022 A1* | 8/2015 | Hung | G06F 3/0446 345/174 |
| 2015/0286288 A1* | 10/2015 | Lee | G06F 3/03 345/173 |
| 2015/0346866 A1* | 12/2015 | Kusunoki | G06F 3/0446 345/174 |
| 2016/0202781 A1* | 7/2016 | Kim | G06F 1/1643 345/173 |
| 2016/0372083 A1* | 12/2016 | Taite | G06F 3/04886 |
| 2017/0011714 A1* | 1/2017 | Eim | G06F 3/0362 |
| 2017/0168769 A1* | 6/2017 | Jeon | G06F 3/0487 |
| 2017/0212637 A1* | 7/2017 | Choi | G06F 3/0445 |
| 2018/0039127 A1* | 2/2018 | Eom | G06F 3/0412 |
| 2018/0321708 A1* | 11/2018 | Wu | G06F 3/0443 |
| 2019/0384357 A1* | 12/2019 | Choi | G06F 1/1616 |

* cited by examiner

ABSTRACT# TOUCH PANEL AND TOUCH PANEL OPERATION METHOD THEREOF

BACKGROUND OF THE DISCLOSURE

1. Field of the Disclosure

The present disclosure relates to a touch panel and touch panel operation method thereof, and more particularly, to a flexible touch panel and touch panel operation method thereof.

2. Description of the Prior Art

In recent years, flexible electronic devices have become one of the development focuses of the next generation electronic device technology. Therefore, the demand for display devices that can be integrated into flexible electronic devices is gradually increasing. When the flexible display device is in a bent state, false noise may be generated in the folding region, thereby interfering with the operation of the flexible display device. How to improve the signal processing quality of flexible display devices is still an important issue for manufacturers.

SUMMARY OF THE DISCLOSURE

The present disclosure discloses a touch panel, including an active region and a non-active region in an operating state. The touch panel includes a plurality of sensing electrodes, disposed in the active region and the non-active region; and a controller, for receiving an active touch signal from the plurality of sensing electrodes located in the active region and a non-active touch signal from the plurality of the sensing electrodes located in the non-active region; wherein the controller manages the active touch signal and the non-active touch signal, so that only the active touch signal is subjected to a subsequent process.

The present disclosure discloses a touch panel operation method for a touch panel. The touch panel operation method includes receiving an active touch signal and an non-active touch signal, wherein the touch panel comprises an active region and a non-active region in an operating state, and the touch panel comprises a plurality of sensing electrodes, the active touch signal is from the plurality of sensing electrodes located in the active region, and the non-active touch signal is from the plurality of sensing electrodes located in the non-active region; and managing the active touch signal and the non-active touch signal, so that only the active touch signal is subjected to a subsequent process.

These and other objectives of the present disclosure will no doubt become obvious to those of ordinary skill in the art after reading the following detailed description of the embodiment that is illustrated in the various figures and drawings.

DETAILED DESCRIPTION

Figure 1:
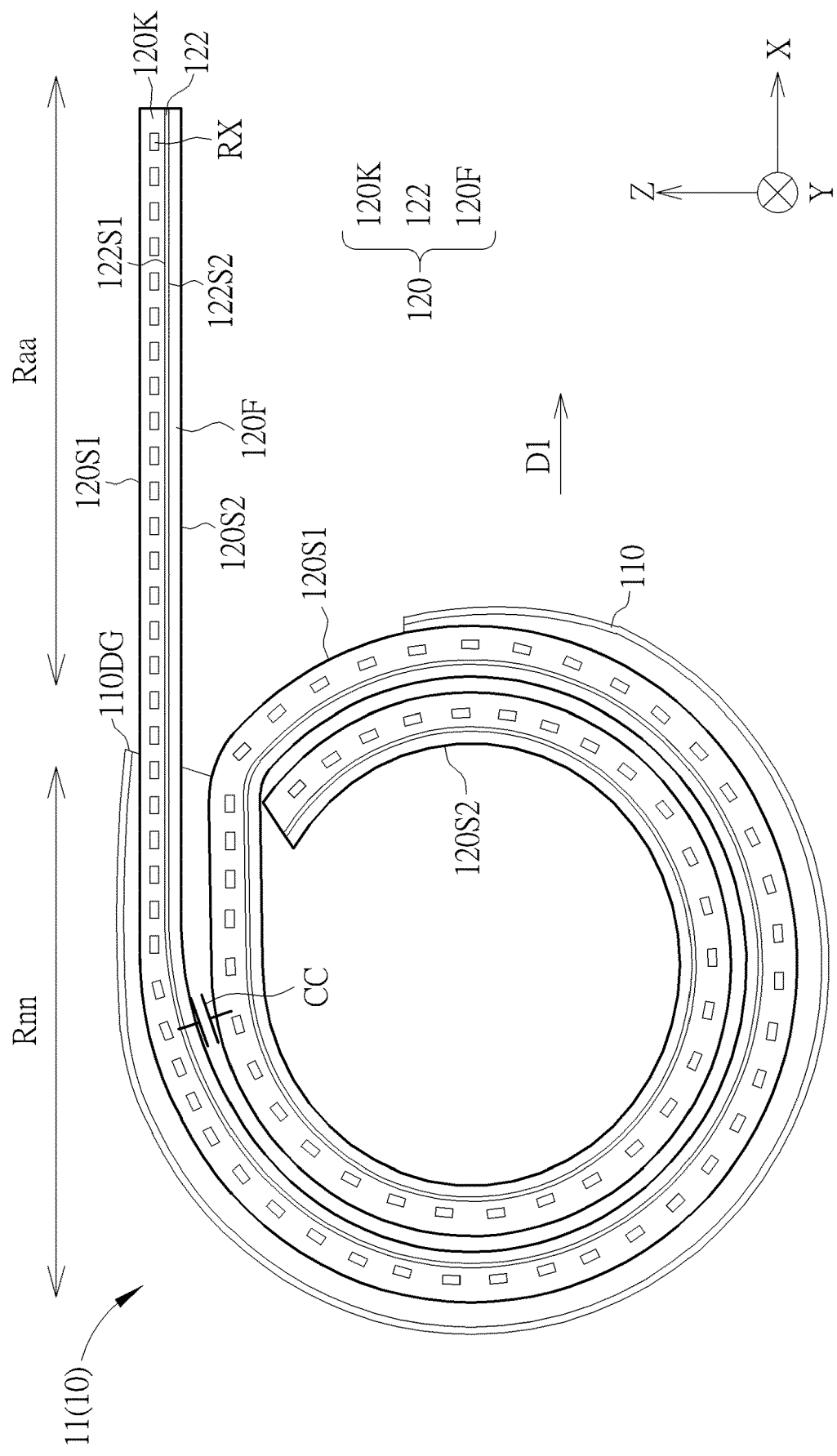
FIG. 1 is a cross-sectional view of a touch panel according to an embodiment of the present disclosure.

The present disclosure has been specifically shown and described with reference to the embodiments and specific features thereof. The embodiments set forth below should be regarded as illustrative rather than restrictive. It is obvious to those skilled in the art that various changes and modifications in form and details can be made without departing from the spirit and scope of the present disclosure.

Before further describing the embodiments, the following describes specific terms used in the full text.

The meaning of terms "on" and "above" should be read in its broadest way. When an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

Furthermore, terms "bottom", "below", "above" "top" describe relative position of the different elements in figures. However, when figures are flipped upside down, foregoing the "top" become "bottom". It should be understood that in addition to the directions shown in the figures, the spatially relative terms are intended to cover different directions of the device in use or operation.

The terms "formed" or "disposed" are used in the following to describe the act of applying material layers to a substrate. These terms are intended to describe any feasible layer formation technique, including but not limited to thermal growth, sputtering, evaporation, chemical vapor deposition, epitaxial growth, electroplating, etc.

The ordinal numbers used in the description and claims, such as "first", "second", etc., are used to modify the element of claims. It does not imply and represent that the claimed element has any previous ordinal number, and it does not represent a sequence of a claimed element and another claimed element, or a sequence in the process. The use of these ordinal numbers is only used to make a clear distinction between a claimed element and another claimed element with the same name.

It should be understood that although the terms first, second, etc. may be used herein to describe various elements, components, regions, layers or/and parts, these elements, components, regions, layers or/and parts should not be limited by these terms. These terms are only used to distinguish one element, component, region, layer or/and part from another element, component, region, layer or/and part. Therefore, without departing from the teachings of the present disclosure, the first element, the first component, the first region, the first layer, or the first part discussed below may also be referred to as the second element, the second component, or the second region, the second layer or the second part.

In addition, phrases such as "within the range between the first value and the second value" indicates that the range includes the first value, the second value, and other values between them.

It should be understood that multiple embodiments are listed below to illustrate different technical features, but these technical features may be mixed or combined in different ways without conflicting with each other.

Certain terms are used in the specification and claims to refer to specific components. However, those skilled in the art of the present disclosure should understand that manufacturers may use different terms to refer to the same component. Moreover, this specification and claims do not use the difference in names as a way of distinguishing components, but uses the overall technical difference of the components as the criterion for distinguishing.

The "comprising" mentioned in the entire specification and claims is an open term, so it should be interpreted as "including but not limited to". When the terms "including" and/or "having" are used in this specification, they specify the existence of the features, regions, steps, operations, and/or elements, but do not exclude one or more existence or addition of other features, regions, steps, operations, elements, and/or combinations thereof.

Furthermore, the term "coupling" here includes any direct and indirect connection means. Therefore, if it is described that a first device is coupled to a second device, it means that the first device may be directly connected to the second device, or may be indirectly connected to the second device through other devices or other connection means.

In order to enable those skilled in the art to better understand the disclosure, the following specifically enumerates the embodiments of the disclosure, together with the accompanying drawings, to describe in detail the content of the disclosure and the effects to be achieved. It should be noted that the drawings are simplified schematic diagrams. Therefore, only the elements and combination relationships related to the present disclosure are shown, and some elements are omitted to provide a clearer description of the basic structure or implementation method of the present disclosure. The components and layout may be more complicated.

In addition, for the convenience of description, the components shown in the drawings of the present disclosure are not drawn to the same proportions as the actual numbers, shapes, and sizes of the components, and the detailed proportions can be adjusted according to design requirements.

The electronic device disclosed in the present disclosure may include, for example, a display device, an antenna device, a sensing device, a touch display device, a curved electronic device or a free shape display device, or a spliced electronic device, but not limited to this. The electronic device may be, for example, a liquid crystal antenna, but it is not limited to this. An electronic device of the present disclosure may be any combination of the above, but not limited thereto. The appearance of the electronic device may be rectangular, circular, polygonal, a shape with curved edges, or other suitable shapes. The electronic device may have a drive system, control system, a light source system, shelving systems and other peripheral systems to support the display device or an antenna device. The electronic device of the present disclosure may be used in electronic products capable of displaying images, such as notebook computers and smart phones, but is not limited to this.

Figure 2:
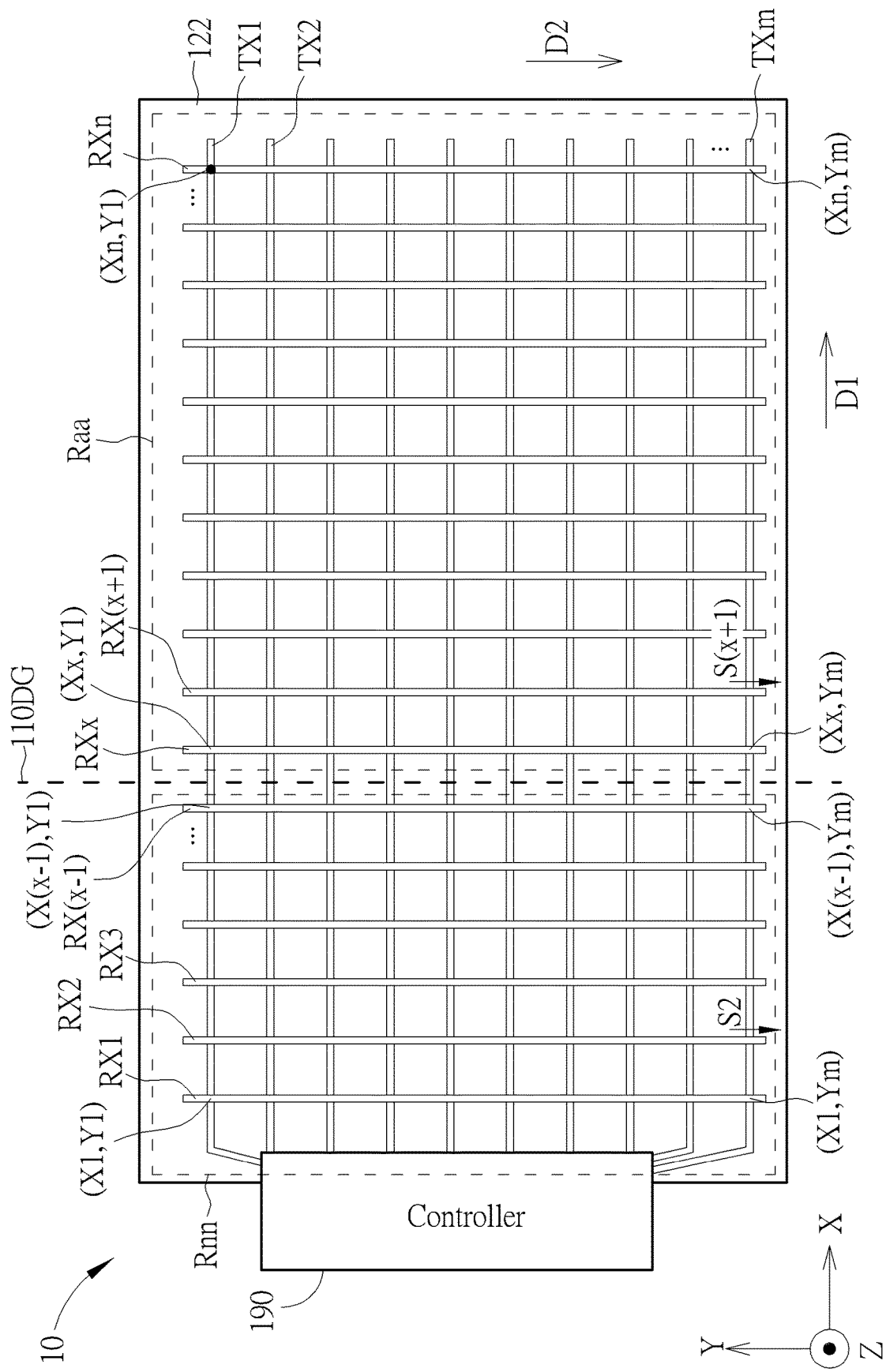
FIG. 2 is a top view of the touch panel shown in FIG. 1.

Please refer to FIG. 1 and FIG. 2. FIG. 1 is a cross-sectional view of a touch panel 10 according to an embodiment of the present disclosure, and FIG. 2 is a top view of the touch panel 10 shown in FIG. 1. As shown in FIG. 1, an electronic device 11 includes the touch panel 10. The touch panel 10 includes a housing 110, a flexible element 120 and a controller 190. In an operating state, the touch panel 10 includes an active region Raa and a non-active region Rnn.

The touch panel 10 includes a plurality of sensing electrodes disposed in the active region Raa and the non-active region Rnn. The controller 190 may receive an active touch signal from the plurality of sensing electrodes located in the active region Raa and a non-active touch signal from the plurality of sensing electrodes located in the non-active region Rnn. The controller 190 may manage the active touch signal and the non-active touch signal, so that only the active touch signal is subjected to a subsequent process. The operating state may be defined as an operating state in which at least part of the flexible element 120 is drawn out when the touch panel 10 is activated, for example, an operating state that the touch panel 10 is powered on and at least part of the flexible element 120 is exposed (for example, at least part of the flexible element 120 is drawn out from the housing 110). According to some embodiments, as shown in FIG. 1, in the operating state, at least part of the flexible element 120 may be housed in the housing 110.

The flexible element 120 of the touch panel 10 may have a flexible characteristic, for example, repetitively bendable along at least one bending axis. According to some embodiments, the touch panel 10 may be a flexible touch panel. A flexible display panel means a display panel capable of being curved, folded, stretched, rolled, flexed, bended or other similar deformation. As shown in FIG. 1, the touch panel 10 is rollable.

The flexible element 120 of the touch panel 10 may have an active region Raa and a non-active region Rnn. As shown in FIG. 1, the touch panel 10 may be drawn out or drawn in along a first direction D1. The non-active region Rnn may be the part where the flexible element 120 of the touch panel 10 is drawn into the housing 110, and the active region Raa may be the part where the flexible element 120 of the touch panel 10 is drawn out of the housing 110. The housing 110 has an edge 110DG. For example, in FIG. 1, the flexible element 120 located in the non-active region Rnn is drawn into the housing 110 and is shielded by the housing 110. The flexible element 120 located in the active region Raa is drawn out of the housing 110 and thus not shielded by the housing 110. Therefore, the edge 110DG of the housing 110 may be used to define the active region Raa and the non-active region Rnn.

The flexible element 120 includes a composite layer 120K, a flexible substrate 122, and a functional layer 120F. As shown in FIG. 1, the flexible substrate 122 has a surface 122S1 and a surface 122S2. The composite layer 120K is disposed on the surface 122S1 of the flexible substrate 122, and the functional layer 120F is disposed on the surface 122S2 of the flexible substrate 122.

The composite layer 120K may include a plurality of sensing electrodes. The sensing electrodes may perform touch sensing or fingerprint recognition sensing. The sensing electrodes may include receiving electrodes RX, transmitting electrodes TX, or a combination thereof. According to some embodiments, FIG. 2 illustrates the case where the sensing electrodes include the receiving electrodes RX and the transmitting electrodes TX, but the present disclosure is not limited to this. According to some embodiments, the sensing electrode may only include the receiving electrodes RX but not the transmitting electrode TX. According to some embodiments, in the case where the sensing electrodes include both the receiving electrodes RX and the transmitting electrodes TX, for convenience of description, both RX and TX may be referred to as sensing electrodes. The sensing method of sensing electrodes is not limited, and may be capacitive sensing, mutual capacitance sensing, self-capacitance sensing, resistive sensing, or a combination thereof.

According to some embodiments, as shown in FIG. 2, the sensing electrodes RX may be disposed in the active region Raa and the non-active region Rnn, and the sensing electrodes RX may be divided into a sensing electrode RX1, a sensing electrode RX2, . . . , a sensing electrode RX(x−1), a sensing electrode RXx, a sensing electrode RX(x+1), . . . , a sensing electrode RXn, where n and x are positive integers. The sensing electrodes RX1 to the sensing electrode RX(x−1) are distributed in the non-active region Rnn, and the sensing electrodes RXx to the sensing electrodes RXn are distributed in the active region Raa. Similarly, the sensing electrodes TX may also be divided into a sensing electrode TX1 to a sensing electrode TXm, where m is a positive integer. According to some embodiments, as shown in FIG. 2, the sensing electrodes RX to RXn may be disposed along the first direction D1, and the sensing electrodes TX to TXm may be disposed along a second direction D2. The first direction D1 and the second direction D2 may be different; for example, the first direction D1 and the second direction D2 may be perpendicular.

The flexible element 120 may have a surface 120S1 and a surface 120S2. In some embodiments, the controller 190 may be disposed on the surface 120S1 of flexible element 120, but the present disclosure is not limited thereto, and a controller 190 may also be disposed on surface 120S2 of the flexible element 120.

The controller 190 may include a central processing unit, a microprocessor, an integrated circuit (IC), an application specific integrated circuit (ASIC), a gate driver, a data driver, a timing controller, other functional circuits, or a combination thereof.

The controller 190 may receive an active touch signal and a non-active touch signal. The active touch signal may be from the sensing electrode RXx to the sensing electrode RXn located in the active region Raa, for example, the active touch signal S(x+1) may be from the sensing electrode RX(x+1) located in the active region Raa. The non-active touch signal may be from the sensing electrode RX1 to the sensing electrode RX(X−1) located in the non-active region Rnn, for example, a non-active touch signal S2 may be from the sensing electrode RX2 located in the non-active region Rnn.

After drawn in, the flexible element 120 may have friction, or adjacent segments of flexible elements 120 becomes closer or in contact with each other, or the signal of the adjacent functional layer 120F is sensed by the sensing electrode RX1 to the sensing electrode RX (x−1) located in the non-active region Rnn, or the sensing electrode RX1 to the sensing electrode RX(x−1) located in the non-active region Rnn and the functional layer 120F may induce the capacitance CC shown in FIG. 1, so that the sensing electrode RX1 to the sensing electrode RX(x−1) located in the non-active region Rnn may erroneously sense the non-active touch signal. According to some embodiments, the controller 190 may perform touch signal management, so that only the active touch signal is subject to subsequent processing. Thus, it is possible to reduce or avoid interference with operation of the touch panel 10 from noise (e.g., the non-active touch signal) generated by the sensing electrode RX1 to the sensing electrode RX(x−1) located in the non-active region Rnn. In this way, the problem of noise interference may be solved.

Figure 3:
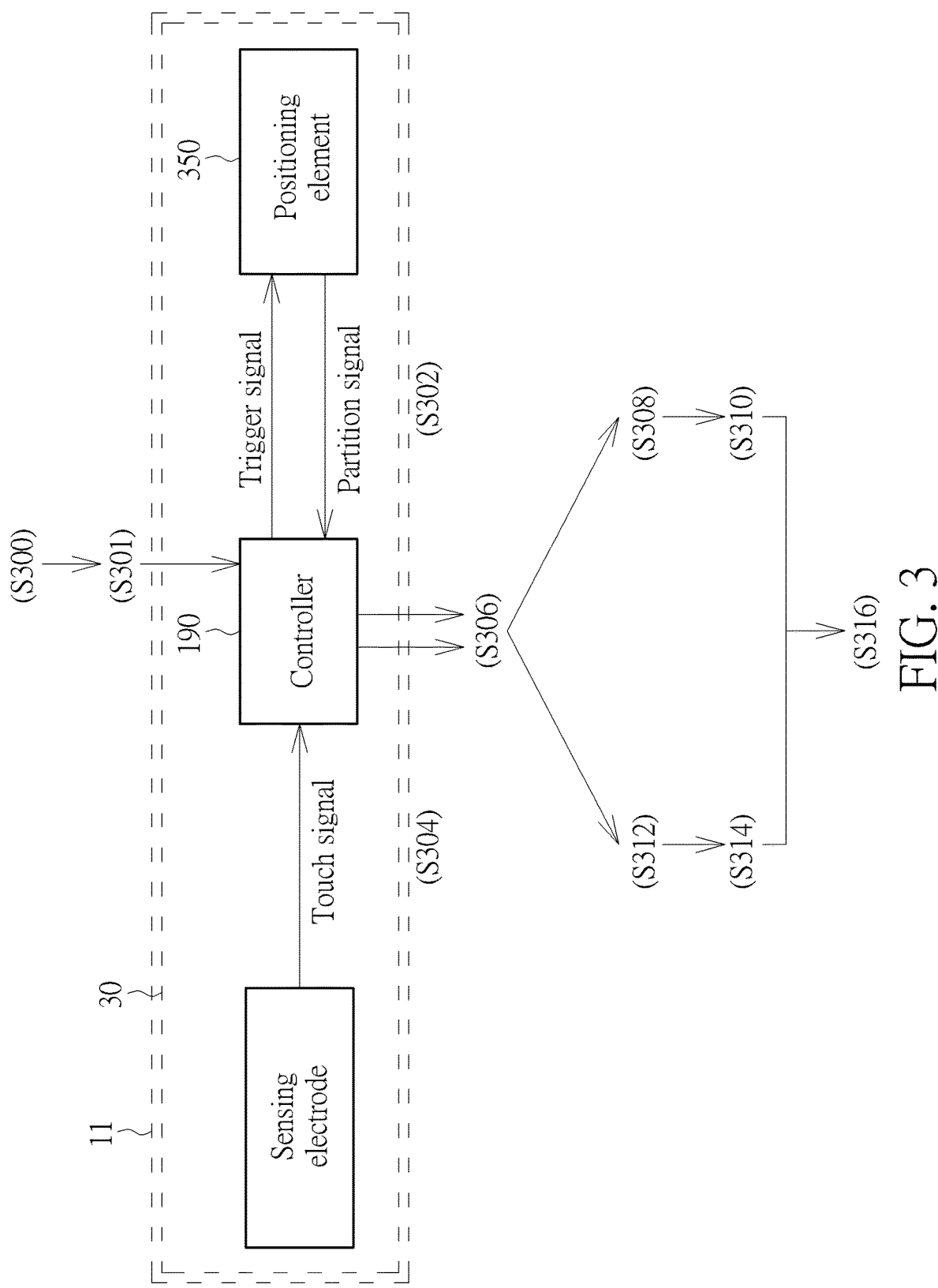
FIG. 3 is a schematic diagram of a touch panel operation method of a touch panel according to an embodiment of the present disclosure.

Specifically, please refer to FIG. 3, which is a schematic diagram of a touch panel operation method of a touch panel 30 according to an embodiment of the present disclosure. The structure of the touch panel 30 shown in FIG. 3 is similar to that of the touch panel 10 shown in FIG. 1, so the same components are represented by the same symbols.

The touch panel 30 also includes a positioning element 350 for determining the ranges of the active region Raa and the non-active region Rnn. The positioning element 350 may be coupled with the controller 190. According to some embodiments, the positioning element 350 may perform signal transmission with the controller 190. The positioning element 350 shown in FIG. 3 may be a detector. For example, the detector may include an optical sensor, an electromagnetic wave sensor, a capacitive sensor, a resistive sensor, a photographing device, a magnetic sensor, and a flexion state detector, other suitable detectors, or combinations thereof. In some embodiments, the positioning element 350 may be a position detecting element that detects the relative positional relationship between the housing 110 and the flexible element 120, to determine the ranges of the active region Raa and the non-active region Rnn. In some embodiments, the positioning element 350 may be a state detecting element that may detect the flexion state of the flexible element 120 to determine the ranges of the active region Raa and the non-active region Rnn. Several embodiments will be given below to illustrate specific implementation types of the positioning element 350.

The operation of the touch panel 30 may be summarized as the touch panel operation method shown in FIG. 3, which may include the following steps:

Step S300: Start.

Step S301: Enter an operating state.

Step S302: The controller 190 may perform signal transmission with the positioning element 350 to partition the touch panel 10 into the active region Raa and the non-active region Rnn.

Step S304: Perform sensing, such as touch sensing. The controller 190 may receive an active touch signal from the sensing electrode RXx to the sensing electrode RXn located in the active region Raa, and a non-active touch signal from the sensing electrode RX1 to the sensing electrode RX(X−1) located in the non-active region Rnn.

Step S306: The controller 190 manages the active touch signal and the non-active touch signal. The controller 190 may determine whether a touch position is located in the active region Raa or in the non-active region Rnn. If the controller 190 determines that an active touch signal is received, go to step S308; if the controller 190 determines that a non-active touch signal is received, go to step S312.

Step S308: The controller 190 allows only the active touch signal subject to a subsequent process, and step S310 is executed.

Step S310: Perform corresponding operations according to the active touch signal.

Step S312: The controller 190 bypasses the non-active touch signal, and step S314 is executed.

Step S314: No corresponding operation is performed.

Step S316: End.

The steps of the touch panel operation method are described in detail as follows.

In step S301, the touch panel 10 may enter an operating state. At this time, the touch panel 10 may have an active region Raa and a non-active region Rnn in an operating state.

In step S302, the positioning element 350 operates according to an instruction (e.g., a trigger signal) of the controller 190, and reports a partition signal to the controller 190.

In addition, the positioning element 350 or the controller 190 may determine that the active region Raa is located between the coordinates (Xx, Y1) and the coordinates (Xn, Ym) shown in FIG. 2 and may determine that the non-active region Rnn is located between the coordinates (X1, Y1) and the coordinates (X(x−1), Ym) shown in FIG. 2. Since the ranges of the active region Raa and the non-active region Rnn are variable, the positioning element 350 or the controller 190 may determine the ranges of the active region Raa and the non-active region Rnn.

Figure 4:
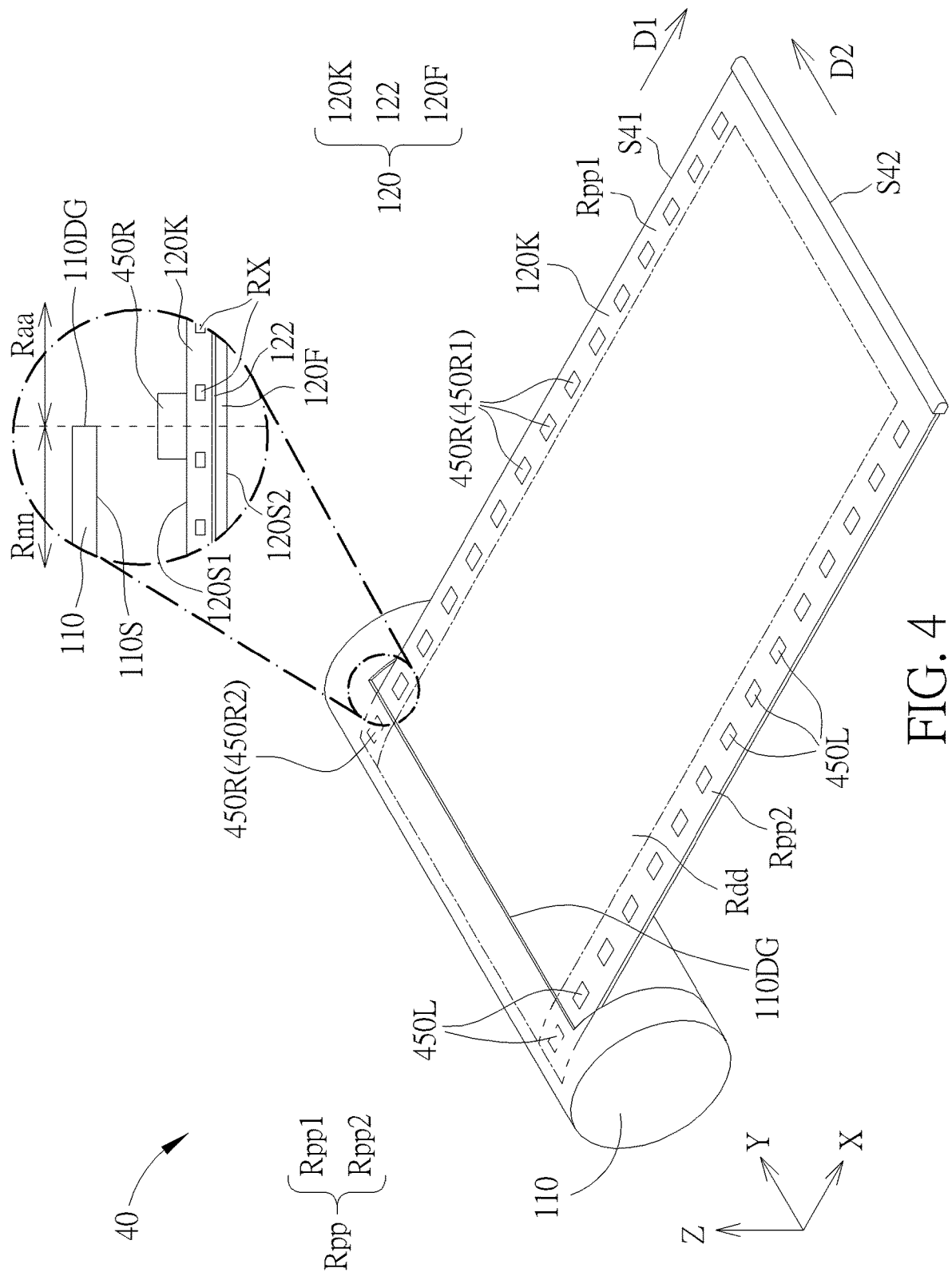
FIGS. 4 to 6 are respectively schematic diagrams of a touch panel according to embodiments of the present disclosure.

For example, please refer to FIG. 4. FIG. 4 is a schematic diagram of a touch panel 40 according to an embodiment of the present disclosure. FIG. 4 also shows a schematic diagram of a partial enlarged cross-sectional view between the housing 110 and the flexible element 120 of the touch panel 40. The structure of the touch panel 40 shown in FIG. 4 is similar to that of the touch panel 10 shown in FIG. 1, so the same components are represented by the same symbols.

As shown in FIG. 4, the touch panel 40 may have a display region Rdd and a peripheral region Rpp. The peripheral region Rpp may be disposed in at least one side of the display region Rdd. In this embodiment, the peripheral region Rpp may surround the display region Rdd. The display cell (for example, the display cell 1242 shown in FIG. 10 to FIG. 13), the sensing electrode RX1 to the sensing electrode RXn, the sensing electrode TX1 to the sensing electrode TXm, or other sensing units of the touch panel 40 may be disposed in the display region Rdd. The peripheral circuits of the display device 10 may be disposed in the peripheral region Rpp, and the peripheral circuits may comprise, for example, peripheral wires, a gate driver, a data driver, a demultiplexer (DeMux) or/and other functional circuits. The peripheral circuits may be electrically connected to the controller 190, the sensing electrode RX1 to the sensing electrode RXn or/and the sensing electrode TX1 to the sensing electrode TXm.

As shown in FIG. 4, the touch panel 40 further includes a plurality of positioning elements 450R and a plurality of positioning elements 450L for determining the ranges of the active region Raa and the non-active region Rnn. As shown in FIG. 4, the positioning elements 450R or the positioning elements 450L may be located in the peripheral region Rpp of the touch panel 40, but the present disclosure is not limited thereto. The positioning elements 450R or the positioning elements 450L may also be located in the display region Rdd of the touch panel 40. As shown in FIG. 4, the positioning elements 450R or the positioning elements 450L are disposed on the surface 120S1 of the flexible element 120, but the present disclosure is not limited to this. The positioning elements 450R or the positioning elements 450L may also be disposed inside the flexible element 120, for example, disposed in the display layer (e.g., the display layer 124 shown in FIGS. 10 to 13).

In some embodiments, the positioning element 450R or the positioning element 450L may be disposed regularly or randomly. As shown in FIG. 4, the touch panel 40 has a first side S41 and a second side S42, and the first side S41 is connected to the second side S42. The first side S41 may be parallel to the first direction D1, and the second side S42 may be parallel to a second direction D2. The touch panel 40 may be drawn out along the first direction D1. The peripheral region Rpp of the touch panel 40 may be divided into a first region Rpp1 and a second region Rpp2. In the second direction D2, the first region Rpp1 and the second region Rpp2 are located on two sides of the display region Rdd, respectively. The positioning elements 450R may be disposed in the first region Rpp1, and may be disposed along the first direction D1. The positioning elements 450L may be disposed in the second region Rpp2, and may be disposed along the first direction D1. In some embodiments, the positioning elements 450R are respectively aligned to the positioning elements 450L; that is, aligned along the second direction D2. In some embodiments, the positioning elements 450R and the positioning elements 450L are disposed in a staggered arrangement so that the positioning elements 450R are not aligned with the positioning elements 450L. In some embodiments, the distance between two adjacent ones of the positioning elements 450R or the positioning elements 450L may be greater than or equal to the distance between two adjacent ones of the sensing electrodes RX. In some embodiments, only the positioning elements 450R may be disposed, or only the positioning elements 450L may be disposed.

In some embodiments, the positioning elements 450R and the positioning elements 450L may include an optical sensor or an electromagnetic wave sensor. In some embodiments, the signal emitted by the positioning elements 450R or the positioning elements 450L may be electromagnetic waves (for example, infrared rays). In some embodiments, the signal emitted by the positioning elements 450R or the positioning elements 450L may be a pulse or an amplitude modulation (AM) signal. In some embodiments, the frequency, amplitude, and waveform of the signal emitted by the positioning elements 450R or the positioning elements 450L may be all the same, partly the same, or all different. In some embodiments, the additional disposed positioning elements 450R or the positioning elements 450L may be used to send a signal. Otherwise, a light-emitting unit (such as the light-emitting unit LE shown in FIGS. 10 to 13) may be used to send a signal, so that the light-emitting unit is defined as a part of the positioning elements 450R or the positioning elements 450L.

In step S302, in one embodiment, the positioning elements 450R or the positioning elements 450L may send a signal according to the trigger signal of the controller 190, or send a signal periodically, or send a signal because of the bending or rolling of the flexible element 120.

The signal emitted by the positioning elements 450R or the positioning elements 450L may be reflected by the surface 110S of the housing 110, or reflected by the edge 110DG of the housing 110, or reflected by a further object. According to the reflected signal received by the positioning elements 450R or the positioning elements 450L, the positioning elements 450R, the positioning elements 450L or the controller 190 may determine whether the positioning elements 450R or the positioning elements 450L is shielded by the housing 110. When the time difference between the time when the positioning component (such as the positioning component 450R2) receives the signal and the time when the signal is sent from the positioning component (i.e. the positioning component 450R2) is less than or equal to a preset length of time, it may be determined that the positioning component (i.e. the positioning component 450R2) is shielded by the housing 110, and it may be determined that the positioning element (i.e. the positioning elements 450R2) is located in the non-active zone Rnn. When the time difference between the time when the positioning component (such as, the positioning elements 450R1) receives the signal and the time when the signal is sent from the positioning element (i.e. the positioning elements 450R1) is greater than the preset length of time, it may be determined that the positioning element (i.e. the positioning elements 450R1) is exposed outside the housing 110, and it may be determined that the positioning element (i.e. the positioning elements 450R1) is located in the active region Raa.

In step S302, the partition signal may be reported to the controller 190 through the detection status of the above-mentioned positioning elements. In this way, the positioning elements may determine the active region Raa and the non-active region Rnn.

In step S304, sensing, such as touch sensing, is performed. The sensing electrode RX1 to the sensing electrode RXn shown in FIG. 2 may perform sensing according to an instruction (such as a driving signal) of the controller 190, and report the sensing result (such as touch signals) to the controller 190. However, the present disclosure is not limited to this. In some embodiments, the sensing electrode RX1 to the sensing electrode RXn and the sensing electrode TX1 to the sensing electrode TXm may perform sensing periodically. In some embodiments, the sensing electrode RX1 to the sensing electrode RXn and the sensing electrode TX1 to the sensing electrode TXm may perform sensing due to the bending or rolling of the flexible element 120.

In some embodiments, the sensing frequency of the sensing electrodes RX1 to the sensing electrode RXn and the sensing electrodes TX1 to the sensing electrodes TXm may be higher than the detection frequency that the positioning sensing element 350 determines the active region Raa and the non-active region Rnn. In some embodiments, time sharing drive may be used, so that the detection time that the positioning element 350 determines the active region Raa and the non-active region Rnn and is not overlapped with the sensing time that the sensing electrode RX1 to the sensing electrode RXn and the sensing electrode TX1 to the sensing electrode TXm perform sensing. In this way, the situation of signal coupling or signal interference may be further reduced. In some embodiments, in order to perform partitioning, detection may be performed in the range from the coordinates (Xx, Y1) to the coordinates (Xn, Ym) shown in FIG. 2, or only a part of the coordinates may be detected.

As shown in FIG. 3, according to some embodiments, the execution of step S302 and step S304 may be switched in order or in parallel depending on different design considerations, which will not be narrated here for brevity.

In step S306, the controller 190 may perform touch signal management. The controller 190 may determine received signal belongs to the active touch signal or the non-active touch signal according to the touch point is located in the active region Raa or located in a non-active region Rnn.

The positioning element 350 or the controller 190 may determine whether the touch point is located in the active region Raa or in the non-active region Rnn. The touch point may be the intersection of the sensing electrode TX1 to the sensing electrode TXm and the sensing electrode RX1 to the sensing electrode RXn whose capacitance value changes. In some embodiments, when the coordinates of the touch point is the coordinates (Xx, Y1) shown in FIG. 2, since the coordinates (Xx, Y1) is located between the coordinates (Xx, Y1) to the coordinates (Xn, Ym) shown in FIG. 2, the controller 190 may determine that the touch point is located in the active region Raa. In some embodiments, when the X coordinate of the touch point is Xx shown in FIG. 2, since the X coordinate is between Xx and Xn, the controller 190 may determine that the touch point is located in the active region Raa.

In step S308, the controller 190 determines that the received signal belongs to an active touch signal, and the controller 190 subjects the active touch signal to a subsequent process. Alternatively, the controller 190 performs corresponding operations according to the active touch signal.

In step S310, a subsequent process is performed on the active touch signal. The subsequent process may be to change the state of the display screen. For example, icon movement, cursor movement, display screen size change, display screen content change, new pattern generation, new image generation, screen wake-up, or a combination thereof, etc., but not limited to this. According to some embodiments, specifically, the screen wakeup means that the touch panel 10 may switch from a low power mode to a high power mode according to the active touch signal, for example, wake up the touch panel 10 and make the screen from darker to lighter. The screen wake-up may also be the display screen being awakened from the original black screen to display image. In some embodiments, step S310 may be omitted or adjusted.

In step S312, the controller 190 determines that the received signal is a non-active touch signal, and the controller 190 makes the non-active touch signal not subject to a subsequent process. Alternatively, the controller 190 does not judge or analyze the non-active touch signal, for example, does not measure the voltage level of the non-active touch signal. Alternatively, the controller 190 bypasses the non-active touch signal. Or, the controller 190 does not perform corresponding operations according to the non-active touch signal.

In step S314, the controller 190 does not perform corresponding operations according to the non-active touch signal. For example, the touch panel 10 does not detect objects touching the non-active region Rnn, and does not perform fingerprint recognition. Alternatively, the touch panel 10 does not change the display state according to the non-active touch signal. For example, the touch panel 10 does not move the cursor. Alternatively, the touch panel 10 does not reduce or enlarge the image. Alternatively, the touch panel 10 maintains the image originally displayed. Alternatively, the touch panel 10 does not switch between the low power mode and the high power mode. In some embodiments, step S314 may be omitted or adjusted.

It may be seen from the above that, according to some embodiments, the controller 190 may bypass the non-active touch signal, so that only the active touch signal is subjected to subsequent processing. That is to say, in terms of signal processing, the non-active touch signal is an erroneous or abnormal signal. Therefore, according to some embodiments, it may be regarded as noise and excluded. Thus, even if the stacked non-active region Rnn of the flexible element 120 has friction, or adjacent segments in the non-active region Rnn of the flexible element 120 becomes closer or in contact with each other, so that the sensing electrode RX1 to the sensing electrode RX (x−1) located in the non-active region Rnn erroneously sense the non-active touch signal, the controller 190 will bypass the non-active touch signal and will not perform signal processing on the non-active touch signal, thereby avoiding interference with operation of the touch panel 10 from noise (e.g., the non-active touch signal) generated by the sensing electrode RX1 to the sensing electrode RX (x−1) located in the non-active region Rnn.

The above are only the embodiments of the present disclosure, and those skilled in the art may make various alterations and modifications accordingly. The following will describe different embodiments of the present disclosure, and to simplify the description, the following description will not repeat the same parts. Furthermore, in the disclosure of each example, the same elements in each embodiment are represented by the same symbols, to facilitate comparison between each embodiment.

For example, in addition to optical sensors or electromagnetic wave sensors, in some embodiments, the positioning elements 450R or the positioning elements 450L shown in FIG. 4 may also include a photographing device (for example, a camera or a video camera), which may be used as an optical sensor. The positioning elements 450R may obtain an external image, and the positioning elements 450R or the controller 190 may analyze the image to determine whether the positioning elements 450R are shielded by the housing 110. In this way, the ranges of the active region Raa and the non-active region Rnn may be determined.

In some embodiments, the positioning elements 450R or the positioning elements 450L shown in FIG. 4 may also include a flexion sensor or a resistive sensor, which may be used to detect the resistance change of the wire in the positioning elements 450R or the positioning elements 450L or the surrounding wires, to derive the bending state of the flexible element 120. When the flexible element 120 is in a folded or bended state, the wires at different positions or the surrounding wires may be deformed to different degrees, so that the resistance of each wire or the surrounding wires may be different. By analyzing the output signal and the input signal of the positioning element 450R or the positioning elements 450L, the folded degree or curvature of the flexible element 120 may be derived. Alternatively, by calculating a different degree of the resistance change of the wire or the surrounding wires, the folded degree or curvature of the flexible element 120 may be derived.

As shown in FIG. 4, when the touch panel 40 is in the operating state, the non-active region Rnn of the flexible element 120 may be folded, bent, stacked, stretched, flexed, or other deformation patterns, and the active region Raa of the flexible element 120 may not be deformed or may maintain a flat state. In some embodiments, when the positioning element 450R, the positioning element 450L or the controller 190 determines that the folded degree or curvature of the flexible element 120 near the positioning element 450R or the positioning element 450L is greater than or equal to a threshold, the positioning element 450R or the positioning element 450L is determined to be located in the non-active region Rnn. When the positioning element 450R, the positioning element 450L or the controller 190 determines that the folded degree or curvature of the flexible element 120 near the positioning element 450R or the positioning element 450L is smaller than a threshold, the positioning element 450R or the positioning element 450L is determined to be located in the active region Raa. In this way, the ranges of the active region Raa and the non-active region Rnn may be determined.

Figure 5:
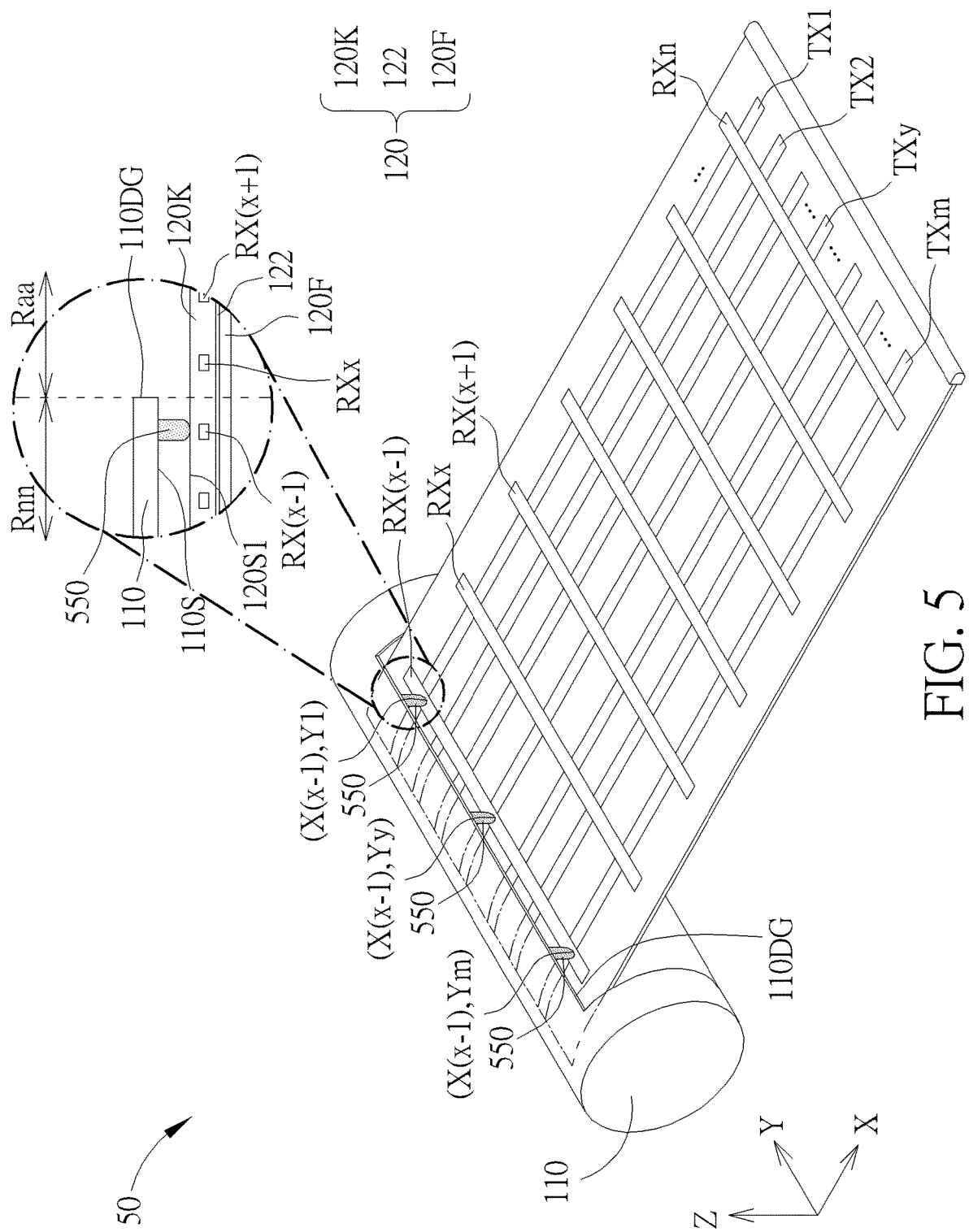

Alternatively, please refer to FIG. 5. FIG. 5 is a schematic diagram of a touch panel 50 according to an embodiment of the present disclosure. The structure of the touch panel 50 shown in FIG. 5 is similar to the touch panel 40 shown in FIG. 4, so the same components are represented by the same symbols. As shown in FIG. 5, the touch panel 50 includes a plurality of positioning elements 550 for determining the ranges of the active region Raa and the non-active region Rnn.

In some embodiments, the positioning elements 550 may be protrusions that protrude from the surface 110S of the housing 110 toward the flexible element 120. In some embodiments, when the positioning element 550 touches the surface 120S1 of the flexible element 120, the sensing electrode (such as the sensing electrode RX(x−1)) may detect the touch of the positioning element 550, such as generating the corresponding non-active touch signal. Since the positioning element 550 is located inside the housing 110, the positioning element 550 corresponds to the non-active region Rnn, and the controller 190 may determine that the sensing electrode (for example, the sensing electrode RX(x−1)) is located in the non-active region Rnn. In this way, the ranges of the active region Raa and the non-active region Rnn may be determined.

In some embodiments, the positioning elements 550 may be disposed regularly or randomly, and the arrangement of the positioning elements 550 presents a special pattern, so that the controller 190 may recognize the positioning elements 550 by pattern comparison. For example, as shown in FIG. 5, the positioning elements 550 located in the non-active region Rnn are disposed into three aligned but scattered points. When the controller 190 detects touch at the coordinates (X(x−1), Y1), the coordinates (X (x−1), Yy) and coordinates (X(x−1), Ym), and coordinates (X(x−1), Y1), coordinates (X (x−1), Yy) and the coordinates (X (x−1), Ym) are aligned but scattered, the controller 190 determines that the positioning element 550 corresponds to the coordinates (X(x−1), Y1), coordinates (X(x−1), Yy) and coordinates (X(x−1), Ym), and the coordinates (X(x−1), Y1), coordinates (X(x−1), Yy) and coordinates (X(x−1), Ym) are non-active region Rnn, and determines the ranges of the active region Raa and the non-active region Rnn accordingly, where y is a positive integer. In some embodiments, the positioning element 550 may be separated from the edge 110DG of the housing 110 along the direction X by a distance to avoid interference with the touch detection of the active region Raa.

In some embodiments, when the positioning element 550 touches the surface 120S1 of the flexible element 120, it may utilize additionally disposed sensing electrodes differently from the sensing electrode RX1 to the sensing electrode RXn and the sensing electrode TX1 to the sensing electrode TXm to detect touch of the positioning element 550. Notably, the sensing frequency of the sensing electrode RX1 to the sensing electrode RXn and the sensing electrode TX1 to the sensing electrode TXm may be different from (e.g., above) the sensing frequency of the additionally disposed sensing electrodes.

Figure 6:
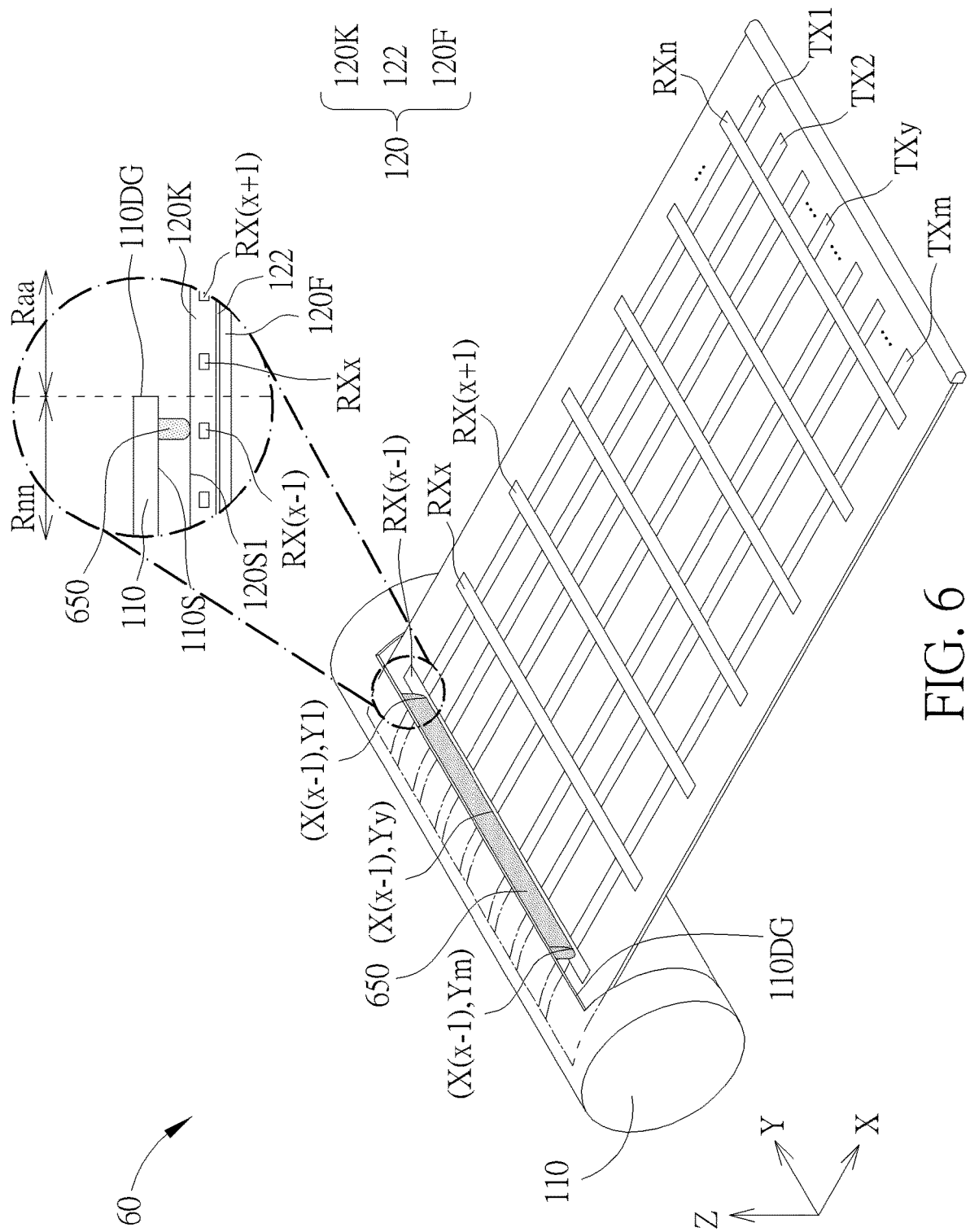

Alternatively, please refer to FIG. 6. FIG. 6 is a schematic diagram of a touch panel 60 according to an embodiment of the present disclosure. The structure of the touch panel 60 shown in FIG. 6 is similar to that of the touch panel 50 shown in FIG. 5, so the same components are represented by the same symbols. As shown in FIG. 6, the positioning element 650 of the touch panel 60 has a continuous structure, so that the controller 190 may identify the positioning element 650 by pattern comparison, so as to determine the ranges of the active region Raa and the non-active region Rnn. In some embodiments, the positioning elements 550, 650 may include dielectric materials. In some embodiments, the positioning elements 550 and 650 may include the same material as the housing 110.

Figure 7:
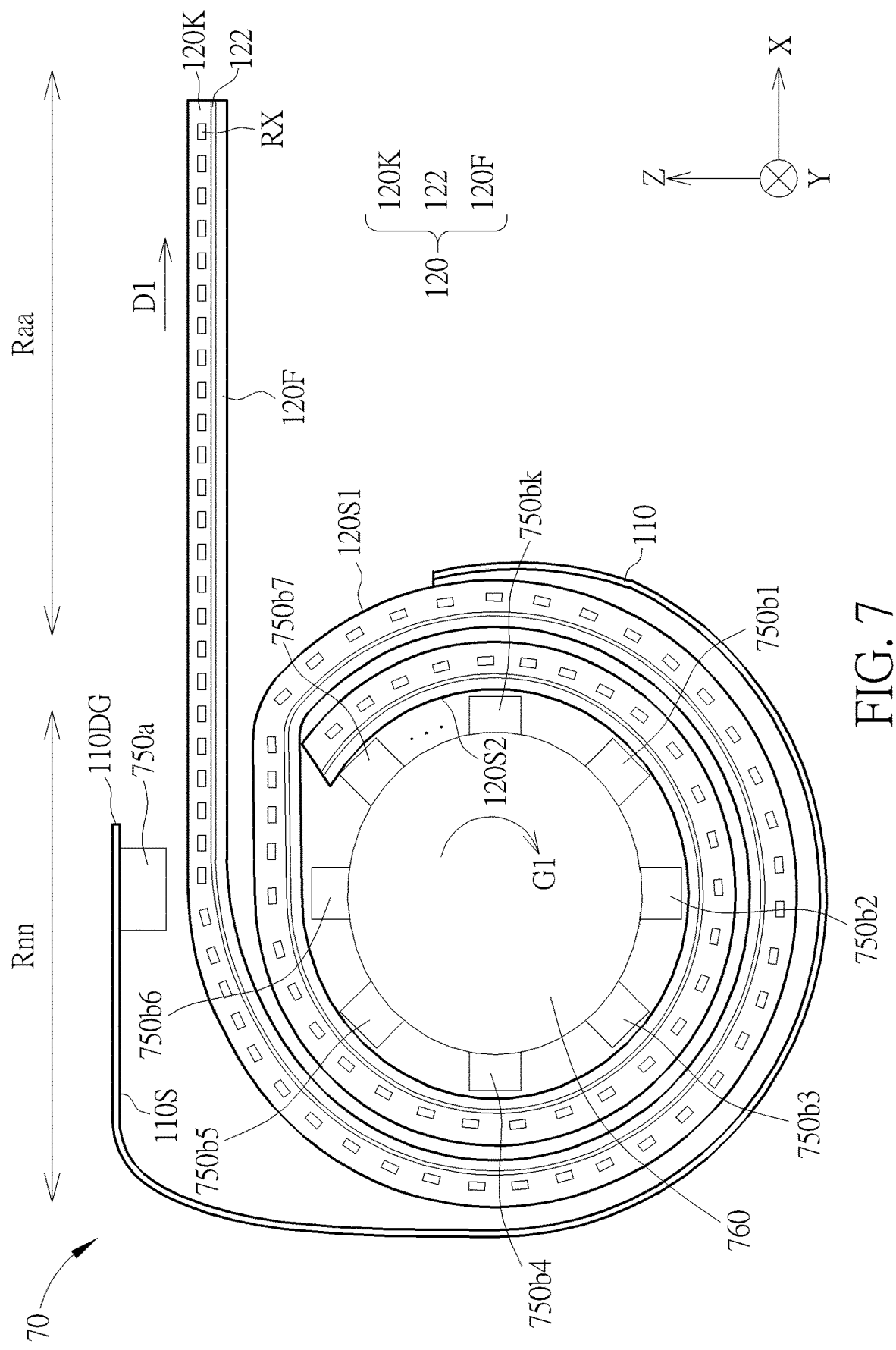
FIGS. 7 to 9 are respectively cross-sectional views of a touch panel according to embodiments of the present disclosure.

Alternatively, please refer to FIG. 7. FIG. 7 is a schematic diagram of a touch panel 70 according to an embodiment of the present disclosure. The structure of the touch panel 70 shown in FIG. 7 is similar to that of the touch panel 10 shown in FIG. 1, so the same components are represented by the same symbols. The main difference between FIG. 7 and FIG. 1 is the design of the positioning elements. As shown in FIG. 7, the touch panel 70 includes a first positioning element 750a, a plurality of second positioning element 750b1 to second positioning element 750bk for determining the ranges of the active region Raa and the non-active region Rnn, where k is a positive integer. The touch panel 70 includes a guiding element 760, which may be disposed in the housing 110. According to the rotation of the guiding element 760, the flexible element 120 may be drawn out or drawn in. For example, if the guiding element 760 rotates in the rotation direction G1, the flexible element 120 may be drawn out along the first direction D1.

In some embodiments, the first positioning element 750a may be disposed on the surface 110S of the housing 110, and the second positioning element 750b1 to the second positioning element 750bk may be disposed on the guiding element 760. The guiding element 760 is fixed in the housing 110 and may be used as a rotating shaft. When the flexible element 120 is drawn out from the housing 110, the second positioning element 750b1 to the second positioning element 750bk on the guide element 760 may be continuously rotated. The second positioning element 750b1 to the second positioning element 750bk may be used as positioning marks. In some embodiments, capacitive sensing or mechanical design (such as a tenon) may be used to determine the relative positional relationship between the second positioning element 750b1 to the second positioning element 750bk and the first positioning element 750a. In some embodiments, the frequency, amplitude, and waveform of the signals emitted by the second positioning element 750b1 to the second positioning element 750bk may be different, so that the relative positional relationship between the second positioning element 750b1 to the second positioning element 750bk and the first positioning element 750a may be determined. By using the relative positional relationship between the second positioning element 750b1 to the second positioning element 750bk and the first positioning element 750a, the ranges of the active region Raa and the non-active region Rnn may be determined. For example, as shown in FIG. 7, when the first positioning element 750a and the second positioning element 750b6 are aligned, the range of the active region Raa and the range of the non-active region Rnn are as shown in FIG. 7. When the flexible element 120 is drawn out in the first direction D1 again, the guiding element 760 may rotate in the rotation direction G1, so that the first positioning element 750a is aligned with the second positioning element 750b4. At this time, the active region Raa and the non-active region Rnn may have different ranges. In some embodiments, the controller 190 may determine the angle of rotation of the guiding element 760, to calculate the length of the flexible element 120 drawn out from the housing 110. In this way, the ranges of the active region Raa and the non-active region Rnn may be determined.

Figure 8:
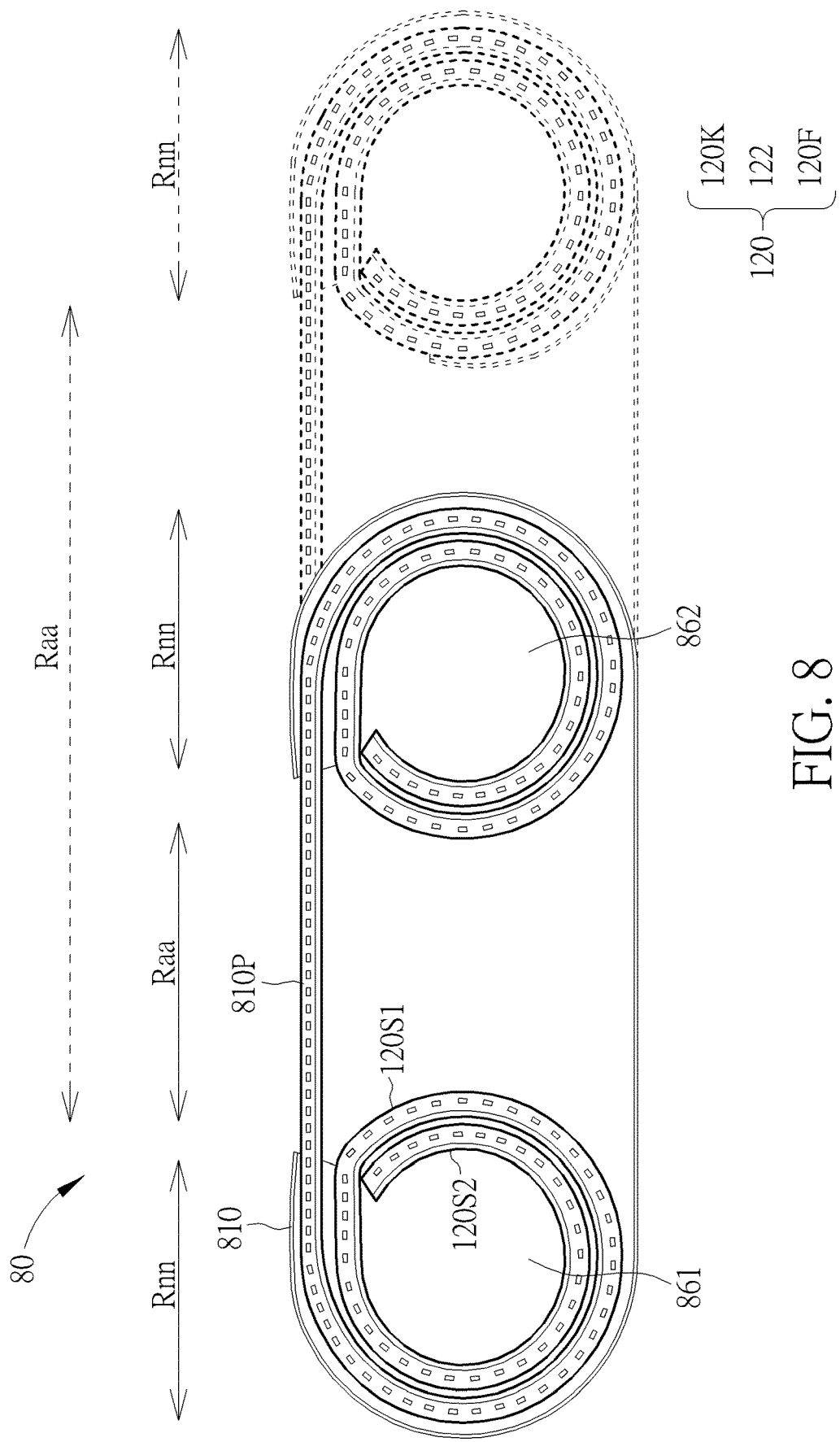

Please refer to FIG. 8. FIG. 8 is a schematic diagram of a touch panel 80 according an embodiment of the present disclosure. The structure of the touch panel 80 shown in FIG. 8 is similar to that of the touch panel 10 shown in FIG. 1, so the same components are represented by the same symbols. As shown in FIG. 8, the touch panel 80 may have two guiding elements 861 and 862 disposed in the housing 810. As shown by the dashed line in FIG. 8, as the flexible element 120 is drawn out from the housing 810, the ranges of the active region Raa increase. In the operating state, the touch panel 80 may have the active region Raa and a non-active region Rnn. The active region Raa may be a part of the flexible element 120 that is not shielded by the housing 810, and the non-active region Rnn may be a part of the flexible element 120 that is shielded by the housing 810. The touch panel 80 may include positioning elements (not shown), and the type and positioning method of the positioning elements may be derived in the above-mentioned embodiment, and will not be repeated here. The operation manner of the touch panel may also be seen in the above-mentioned embodiment, which will not be repeated here.

Figure 9:
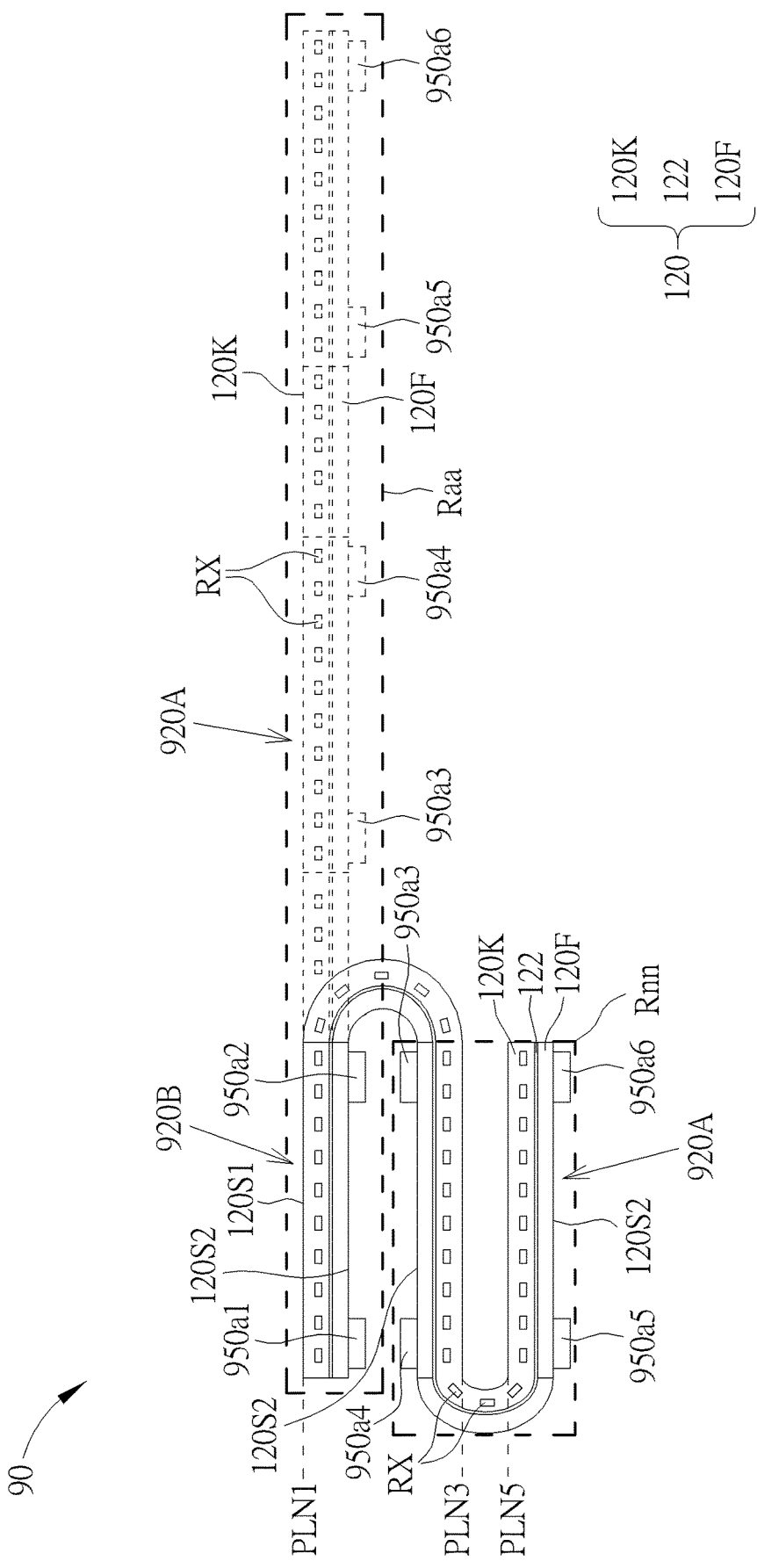

Please refer to FIG. 9. FIG. 9 is a schematic diagram of a touch panel 90 according to an embodiment of the present disclosure. The structure of the touch panel 90 shown in FIG. 9 is similar to that of the touch panel 10 shown in FIG. 1, so the same components are represented by the same symbols. As shown in FIG. 9, the touch panel 90 is foldable. Further, the touch panel 90 further includes a positioning element 950a1 to a positioning element 950a6 for determining the ranges of the active region Raa and the non-active region Rnn. The positioning element 950a1 to the positioning element 950a6 may be disposed on the surface 120S2 of the flexible element 120, for example, disposed on the functional layer 120F. In some embodiments, the positioning element 950a1 to the positioning element 950a6 may be a state detecting device which detects a touch panel 90 is a stacked state (or folded state) or an expanded state (non-folded state), to determine the ranges of the active region Raa and the non-active region Rnn.

As shown by the dashed line in FIG. 9, as the flexible element 120 expands, different parts of the flexible element 120 will not shield each other, so the active region Raa increases and the non-active region Rnn decreases. As the flexible element 120 is stacked, part of the flexible element 120 is shielded, so the active region Raa decreases and the non-active region Rnn increases. As in the above-mentioned embodiment, the controller 190 (not shown) may perform touch signal management and bypass the non-active touch signal to prevent noise generated by the sensing electrodes RX distributed in the non-active region Rnn (for example, the non-active touch signal) from interfering with the operation of the touch panel 90.

As shown in FIG. 9, the flexible element 120 may have a surface 120S1 (also called an outer side) and a surface 120S2 (also called an inner side). The outer side 120S1 may be a display side, and the inner side 120S2 may be a non-display side. The viewer may view the display image of the touch panel 90 on the display side 120S1. The flexible element 120 may include a first portion 920A and a second portion 920B. Specifically, in the stacked state, the first portion 920A of the flexible element 120 may be stacked and shielded by the second portion 920B of the flexible element 120. For example, the first portion 920A of the flexible element 120 may be stacked and disposed on the inner side 120S2 of the second folding portion 920B. The second portion 920B of the flexible element 120 is not shielded by other portions of the flexible element 120. Thus, according to some embodiments, the active region Raa may include the second portion 920B of the flexible element 120, and the non-active region Rnn may include the first portion 920A of the flexible element 120. At least one of the sensing electrodes RX located in the non-active region Rnn is shielded by the sensing electrodes RX in the active region Raa. The sensing electrodes RX located in the active region Raa is not shielded by the sensing electrodes RX in other regions, and may perform touch sensing for a viewer. In the expanded state, the first portion 920A of the flexible element 120 may be expanded. In this state, the active region Raa may include the first portion 920A and the second portion 920B of the flexible element 120.

In addition to the optical sensor, the photographing device, the bending sensor, the resistive sensor, in some embodiments, the positioning elements 950a1 to the positioning element 950a6 may also include a magnetic sensor or other suitable detector. The following takes the positioning element 950a1 and the positioning element 950a4 as magnetic sensors as an example for description. The positioning element 950a1 and the positioning element 950a4 may be disposed on the inner side 120S2 of the flexible element 120. Furthermore, the positioning element 950a1 may be disposed on the second portion 920B of the flexible element 120, the positioning element 950a1 may be disposed on the first portion 920A of the flexible element 120. In the stacked state, the first portion 920A may be stacked, such that the inner side 120S2 of the first portion 920A faces the inner side 120S2 of the second portion 920B. Thus, the positioning element 950a1 and the positioning element 950a4 facing each other may be attracted by magnetic force. Therefore, it may be determined that the non-active region Rnn includes the first portion 920A of the flexible element 120.

According to some embodiments, a positioning element (for example, the positioning element 950a1) may measure a magnetic field, and its corresponding sensing electrode or another positioning element (for example, the positioning element 950a4) may generate a magnetic field, so that the positioning element (for example, the positioning element 950a1) may determine whether to be shielded by the flexible element 120 or other positioning elements (for example, the positioning element 950a4). In this way, the ranges of the active region Raa and the non-active region Rnn may be determined. For example, the positioning element (such as the positioning element 950a4) may include an electromagnetic coil or a permanent magnet to provide a magnetic field. In some embodiments, the positioning element (e.g., the positioning elements 950a1) may include a Hall effect sensor (Hall Effect Sensor), whose output voltage is proportional to the intensity of the applied magnetic field, and may be used to measure magnetic fields.

Alternatively, in some embodiments, the positioning element (for example, the positioning element 950a1) may include a reed switch, which may be used as a magnetic sensor. A reed switch is an electronic switch that is operated by applying a magnetic field, and includes a pair of two ferromagnetic flexible metal contacts, so as to measure the magnetic field. When a magnetic field is applied, the two ferromagnetic flexible metal contact points may attract each other, thereby conducting the reed switch. When the magnetic field is removed, the elastic force of the two ferromagnetic flexible metal contact points will separate and return the two ferromagnetic flexible metal contact points to their original positions, thereby disconnecting the reed switch.

In some embodiments, the positioning element 950a2, the positioning element 950a3, and the positioning element 950a6 may be omitted. In some embodiments, the positioning element 950a2, the positioning element 950a3, the positioning element 950a4, and the positioning element 950a6 may be omitted.

Figure 10:
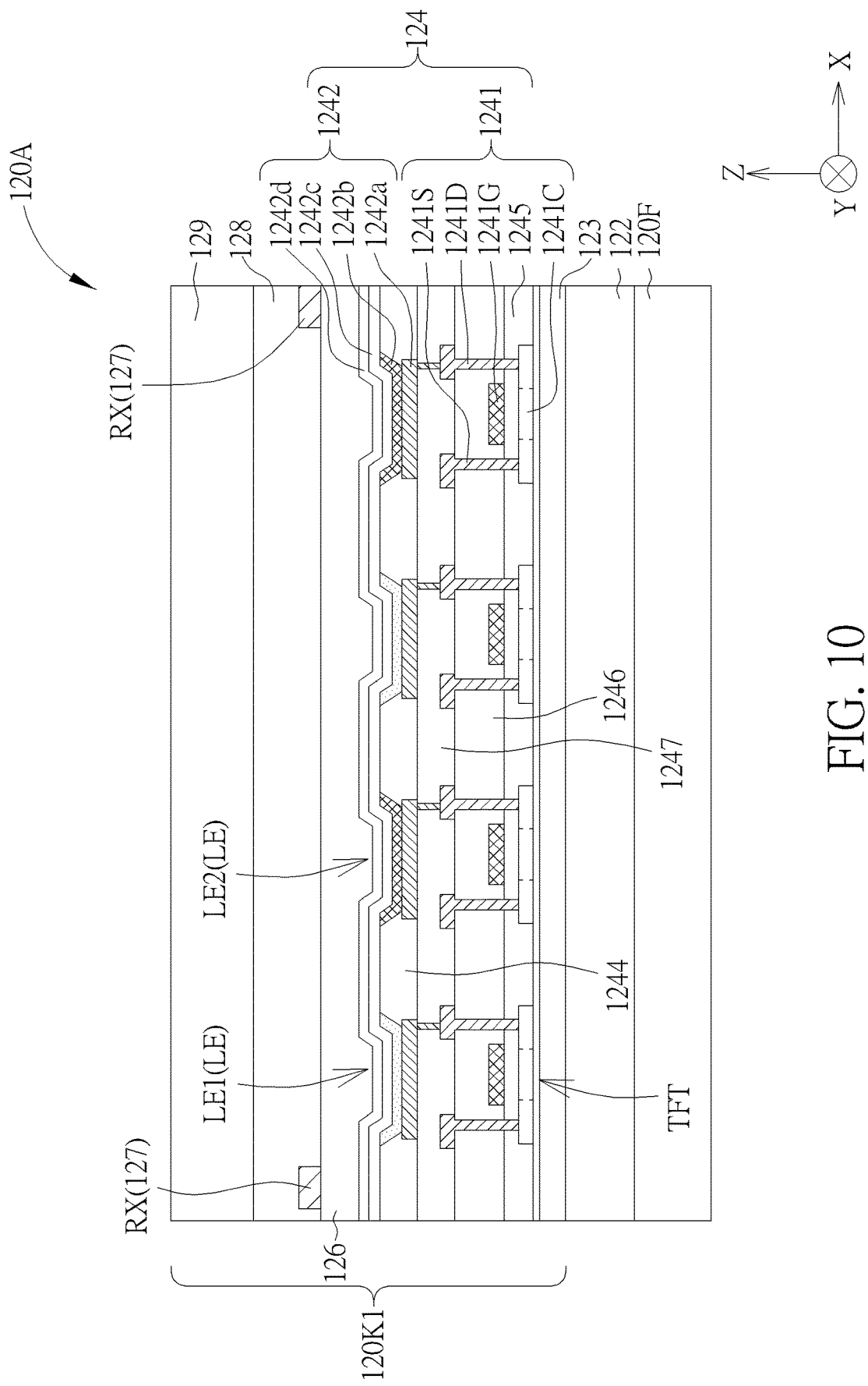
FIGS. 10 to 13 are respectively cross-sectional views of a flexible element according to embodiments of the present disclosure.

Please refer to FIG. 10. FIG. 10 is a cross-sectional view of the flexible element 120A according to an embodiment of the present disclosure. The structure of the flexible element 120A shown in FIG. 10 is similar to the flexible element 120 shown in FIG. 1, so the same components are represented by the same symbols. As shown in FIG. 10, the composite layer 120K1 of the flexible element 120A may include a flexible substrate 122, a buffer layer 123, a display layer 124, an encapsulation layer 126, a sensing layer 127, a characteristic layer 128, and a covering layer 129. The characteristic layer 128 may provide physical properties, such as optical properties, impact resistance properties, etc., but is not limited thereto.

The flexible substrate 122 may be adhered to the functional layer 120F through an adhesive layer. The flexible substrate 122 may include a polymer material, thin glass, or any suitable material. Material of the flexible substrate 122 and the supporting film 1022 may include, for example, polycarbonate (PC), polypropylene (PP), polyethylene terephthalate (PET), polyimide (PI) or polyethylene naphthalate (PEN), other suitable material or combinations of the above material, but not limited thereto. The light transmittance of the flexible substrate 122 is not limited, that is, the flexible substrate 122 may be a transparent substrate or a semi-transparent substrate.

The buffer layer 123 may be disposed between the flexible substrate 122 and the display layer 124. In this embodiment, the buffer layer 123 may include an oxide layer, a nitride layer, an oxynitride layer or other suitable insulating layers, but it is not limited thereto.

The display layer 124 may include a plurality of light emitting units LE located in the display region Rdd of the flexible element 120A. In this embodiment, the display layer 124 may include three types of light-emitting units LE, such as a plurality of first light-emitting units LE1, a plurality of second light-emitting units LE2, and a plurality of third light-emitting units (not shown). For example, the first light-emitting unit LE1 may emit blue light, the second light-emitting unit LE2 may emit green light, and the third light-emitting unit may emit red light, but not limited to this.

The display layer 124 may include a plurality of driving elements 1241 and a plurality of display cells 1242 disposed in several groups, wherein each display cell 1242 may serve as one of the above-mentioned light-emitting units LE. The display cell 1242 may be any kind of display cell or display element, for example, it may include liquid crystal, fluorescence, phosphor, light-emitting diode (LED), quantum dot (QD), other appropriate display medium or any combination of the above, but not limited thereto. The light-emitting diode may include, for example, organic light-emitting diode (OLED), inorganic light-emitting diode, micro light-emitting diode (micro-LED), sub-millimeter light-emitting diode (mini-LED) or a quantum dot (QD) light emitting diode (e.g. may be QLED, QDLED), or other suitable of materials, or any combination of the above, but not limited thereto. In some embodiments, the size of the sub-millimeter light emitting diode may ranges from 100 micrometers (μm) to 300 micrometers. FIG. 10 is an example of an organic light emitting diode. The display cell 1242 includes a first electrode 1242a, a second electrode 1242c, and the light emitting layer 1242b between the first electrode 1242a and the second electrode 1242c. Light emitting region of each display cell 1242 may be defined the dielectric layer 1244 working as a pixel defining layer (PDL). The protective layer 1242d may be selectively disposed and covered on the second electrode 1242c.

The driving element 1241 may include a semiconductor layer 1241C, a dielectric layer 1245, a dielectric layer 1246, a dielectric layer 1247, a gate 1241G, a drain 1241D, and a source 1241S.

The sensing layer 127 may be disposed on the display layer 124 and may include a plurality of sensing electrodes RX. The sensing electrodes RX are disposed in the display region Rdd. In a top view (direction Z) of the flexible element 120A, at least one of the plurality of sensing electrodes RX are disposed between and spaced apart from at least two adjacent light emitting units LE of the plurality of light emitting units LE. In other words, at least one of the plurality of sensing electrodes RX do not overlap at least two adjacent light emitting units LE in a top view of the flexible element 120A. In this embodiment, all the sensing electrodes RX are spaced apart from light emitting units LE, but not limited thereto.

The sensing electrodes RX forming the sensing layer 127 may include metal material and/or metal oxide material, but is not limited thereto. The metal material may include, for example, magnesium (Mg), calcium (Ca), aluminum (Al), silver (Ag), tungsten (W), copper (Cu), nickel (Ni), chromium (Cr), or alloys of one or a plurality of the foregoing materials. The metal oxide material may include, for example, indium tin oxide (ITO), indium zinc oxide (IZO), zinc oxide, or indium oxide. In some embodiments, the sensing electrodes RX forming the sensing layer 127 may include nano silver wires. The sensing electrodes RX forming the sensing layer 127 may independently be a single-layer structure or a multilayer structure. For example, the sensing electrodes RX forming the sensing layer 127 may independently be molybdenum (Mo)/aluminum (Al)/molybdenum (Mo) multilayer structure or titanium (Ti)/copper (Cu)/titanium (Ti) multilayer structure.

The flexible element 120 may also include other sensing layers, for example, a sensing layer including the sensing electrodes TX or a sensing layer of other sensing electrodes. The sensing electrodes RX extending along the direction X and the sensing electrodes TX extends along the direction Y. In some embodiments, the sensing electrodes RX and the sensing electrodes TX may be linear (as shown in FIG. 2). In some embodiments, the sensing electrodes RX and the sensing electrodes TX may be non-linear but extend substantially in one direction, such as a wave shape or a sawtooth shape, or may include a curved shape. For example, the sensing electrodes RX are wave-shaped, but still extend substantially toward the direction X. The sensing layer 127 of the flexible element 120 may further include an insulating layer, located between the sensing electrodes RX and the sensing electrodes TX for electrically isolating different sensing layers.

The functional layer 128 is disposed on and covers the sensing layer 127. The functional layer 128 may be used as a polarizing layer, an optical layer or an impact layer. The functional layer 128 may include an insulating material and provide protection for the sensing layer 127. The functional layer 128 may include organic material, such as hydrophobic organic material, piezoelectric material (e.g. polyvinylidene difluoride (PVDF)) and/or a dielectric elastomer (e.g. rubber, acrylic elastomer, polyurethane elastomer, acrylonitrile butadiene rubber, vinylidene fluoride trifluoroethylene or complexes thereof, but is not limited thereto. When the functional layer 128 is organic material, the suitable functional layer 128 may have a Young's coefficient ranging from 0.01 GPa to 10 GPa, and may have a thickness ranging from 0.8 micrometers to 10 micrometers in the direction Z, but not limited to this. On the other hand, the function layer 128 may include inorganic material such as silicon oxide (SiOx), silicon nitride (SiNx), barium titanate (BaTiO3), lead titanate (PbTiO3), or lead zirconate titanate (PZT), but not limited to this. When the functional layer 128 is inorganic material, the suitable functional layer 128 may have a dielectric constant ranging from 3 to 30, and may have a thickness ranging from 0.01 micrometer to 1 micrometer in the direction Z, which is not limited to this. Through the special design of the above-mentioned functional layer 128, better flexible characteristics and better sensitivity may be obtained, and the probability of breakage during bending may be reduced.

The covering layer 129 may be adhered to the functional layer 128 via an adhesive layer. The cover layer 129 may include polymer material, thin glass, or any suitable material. The covering layer 129 may be formed of transparent reinforced glass, so that the transparent substrate 140 may function as a glass cover, but the present disclosure is not limited thereto. The cover layer 129 material may comprise, for example, polycarbonate (PC), polypropylene (PP), polyethylene terephthalate (PET), polyimide (PI), or polyethylene naphthalate (PEN), other suitable material or combinations thereof, but not limited thereto. The light transmittance of the cover layer 129 is not limited, that is, the cover layer 129 may be a light-transmitting substrate or a semi-light-transmitting substrate.

The functional layer 120F of the flexible element 120A may be used as a support layer, an anti-static layer or a heat dissipation layer. The functional layer 120F of the flexible element 120A may be a conductive film layer or a non-conductive film layer. The functional layer 120F of the flexible element 120A material may include, for example, polyethylene terephthalate (PET), polyimide (PI) or polyethylene naphthalate (PEN), but not limited to this. The material of the functional layer 120F of the flexible element 120A may include, for example, a stainless steel plate, but is not limited thereto.

Figure 11:
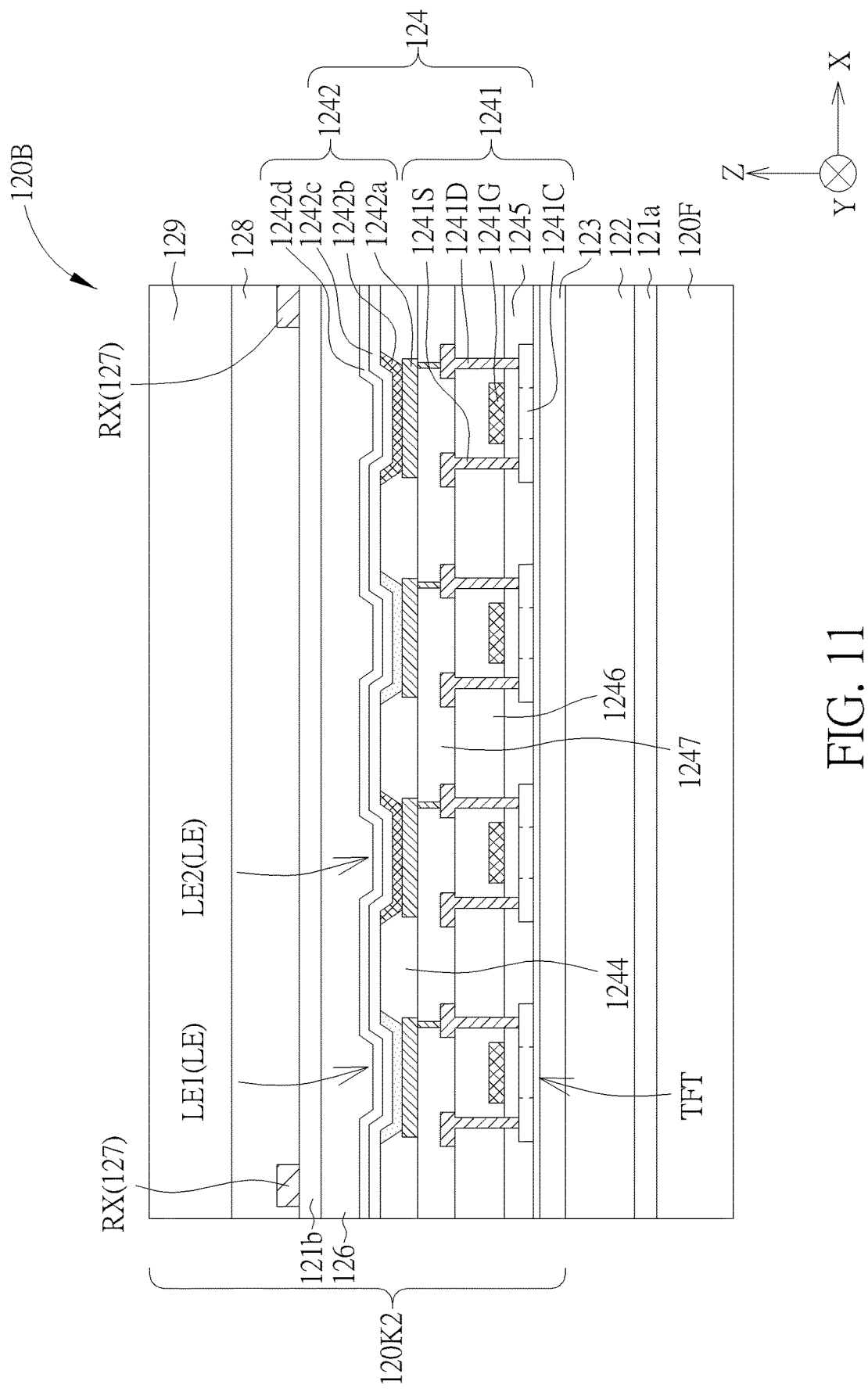

Please refer to FIG. 11. FIG. 11 is a cross-sectional view of the flexible element 120B according to an embodiment of the present disclosure. The structure of the flexible element 120B shown in FIG. 11 is similar to that of the flexible element 120A shown in FIG. 10, so the same components are represented by the same symbols. As shown in FIG. 11, the composite layer 120K2 of the flexible element 120B may further include an adhesive layer 121a and an adhesive layer 121b. The adhesive layer 121a is disposed between the flexible substrate 122 and the functional layer 120F, and the adhesive layer 121b is disposed between the encapsulation layer 126 and the functional layer 128. The adhesive layer 121a and the adhesive layers 121b for adhering may include an optically clear adhesive (OCA) or a pressure sensitive adhesive (PSA), but it is not limited thereto. The adhesive layer 121a and the adhesive layer 121b may include light cure adhesive or heat cure adhesive, but not limited thereto.

Figure 12:
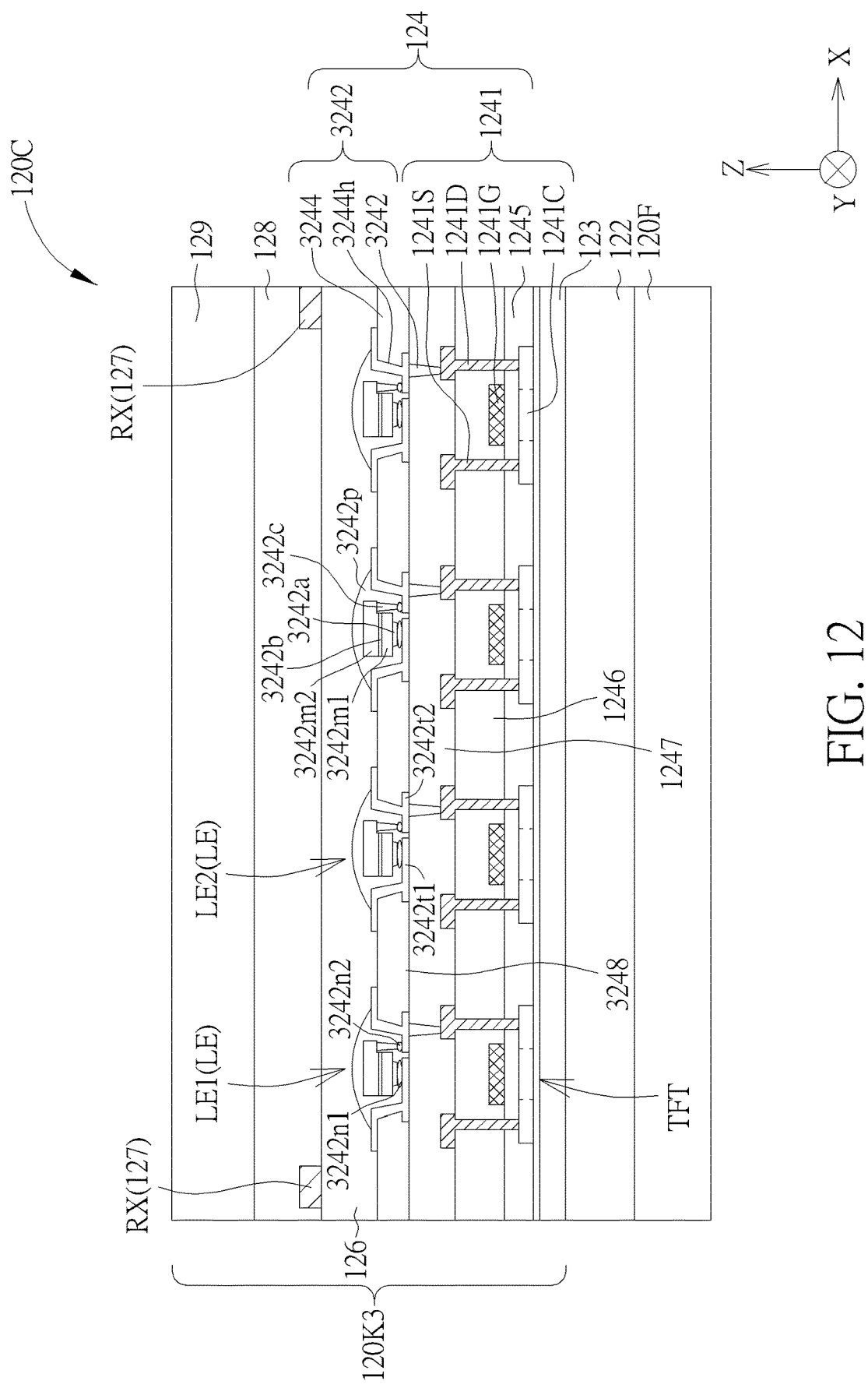

Please refer to FIG. 12. FIG. 12 is a cross-sectional view of a flexible element 120C according to an embodiment of the present disclosure. The structure of the flexible element 120C shown in FIG. 12 is similar to that of the flexible element 120A shown in FIG. 10, so the same components are represented by the same symbols.

As shown in FIG. 12, the display cell 3242 of the flexible element 120C takes a miniature light emitting diode as an example. In some embodiments, the size of the micro light emitting diode may range from 1 micrometer to 100 micrometers. In some embodiments of the present disclosure, the size of the micro light-emitting diode may be minimized to a micrometer-level, so that the light-emitting diode may have a size of 300 micrometers (μm)×300 μm, 30 μm×30 μm, or a cross-sectional area of 10 μm×10 μm, but not limited to this. As shown in FIG. 12, the light emitting unit LE may have a flip chip-type structure. In some embodiments, the light emitting unit LE may also have a vertical type structure. The light emitting unit LE may include a first electrode 3242a, a second electrode 3242c, a first semiconductor layer 3242m1, a light emitting layer 3242b, and a second semiconductor layer 3242m2. For example, the light emitting layer 3242b may be a multiple quantum well (MQW) layer, but is not limited thereto. As shown in FIG. 12, the first electrode 3242a of the light emitting unit LE may be electrically connected to the bonding pad 3242t1 via bonding material 3242n1, and the bonding pad 3242t1 may be further electrically connected to a common source. The second electrode 3242c of the light emitting unit LE may be electrically connected to the bonding pad 3242t2 via a bonding material 3242n2, and the bonding material 3242n2 may be electrically connected to the drain 1241D of the driving element 1241 via the bonding pad 3242t2. Because of this, the driving element 1241 may drive the corresponding light emitting unit LE.

The dielectric layer 3244 may include a plurality of cavities 3244h for disposing at least one of the plurality of light-emitting units LE (for example, the first light-emitting unit LE1). The protective element 3242p is used to protect at least one of the plurality of light-emitting units LE (for example, the first light-emitting unit LE1). The protective element 3242p may cover and fill the cavity 3244h disposed with the light-emitting unit LE. In some embodiments, the protective element 3242p may include organic material, and the organic material may be acryl-based resin, epoxy resin, silicon-based resin, or combination thereof. The protective element 3242p may be a single layer or multiple layers. In some embodiments, the protective element 3242p may have a function of blocking water and/or oxygen.

Figure 13:
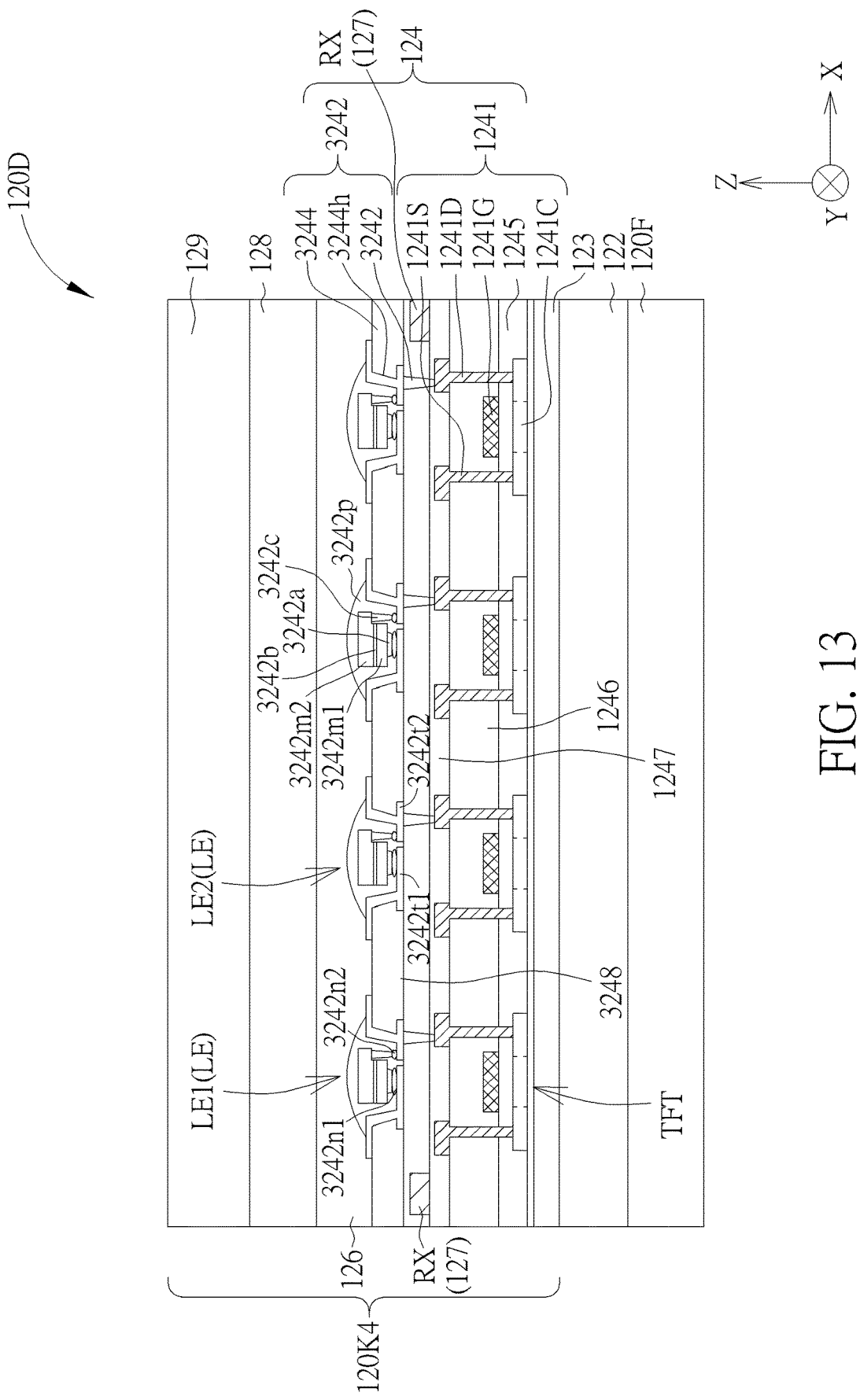

Please refer to FIG. 13. FIG. 13 is a cross-sectional view of the flexible element 120D according to an embodiment of the present disclosure. The structure of the flexible element 120D shown in FIG. 13 is similar to that of the flexible element 120C shown in FIG. 12, so the same components are represented by the same symbols. As shown in FIG. 13, the sensing layer 127 of the flexible element 120D may be disposed inside the display layer 124, and located between the dielectric layer 1247 and the dielectric layer 3244. The sensing layer 127 includes a plurality of sensing electrodes RX. The sensing electrodes RX are disposed in the display region Rdd. In a top view of the flexible element 120D, at least one of the plurality of sensing electrodes RX is disposed between and spaced apart from at least two adjacent light emitting units LE of the plurality of light emitting units LE. The sensing layer 127 of the flexible element 120D may further include an insulating layer 3248 located between the dielectric layer 1247 and the dielectric layer 3244, to ensure electrical isolation.

The following describes how to prove whether the product uses the touch panel of the embodiment of the present disclosure. The proof method, for example, may confirm whether the controller in the product skips the non-active touch signal. According to some embodiments, the touch panel 10 of FIGS. 1 and 2 is taken as an example. The touch panel 10 may bypass non-active touch signals. In some embodiments, it may be derived from datasheet of the touch panel that whether the touch panel 10 bypasses the non-active touch signal. In some embodiments, in order to determine whether the controller 190 bypasses the non-active touch signal, the non-active touch signal may also be generated in the non-active region Rnn through different methods, and then the operation status of the touch panel 10 is detected. In this way, the touch signal management of the controller 190 is determined or analyzed. For example, the housing 110 may be disassembled or drilled holes, so that an object (e.g., a human finger) touches the surface 120S1 located in the non-active region Rnn of the flexible element 120, so that the sensing electrode RX1 to the sensing electrode RX(x−1) located in the non-active region Rnn generate non-active touch signals.

Further, in order to determine whether the controller 190 bypasses the non-active touch signal, in some embodiments, an object (for example, a human finger) may touch the surface 120S1 located in the non-active region Rnn of the flexible element 120, to determine whether the touch panel 10 changes the display state according to the non-active touch signal. For example, if the controller 190 is unable to wake up the touch panel 10 according to the non-active touch signal generated by the object touch, it is determined that the controller 190 may bypass the non-active touch signal and not execute the non-active touch signal. Or, if the controller 190 cannot move the cursor according to the non-active touch signal generated by the object touch, it is determined that the controller 190 may bypass the non-active touch signal and not execute the non-active touch signal. In contrast, the controller 190 may move the cursor or wake up the touch panel 10 in response to the active touch signal, because the controller 190 executes the active touch signal.

Alternatively, in some embodiments, according to the upper limit of the number of multi-touch provided in the datasheet of the touch panel 10 (for example, support for ten-point touch), touch points identical with the upper limit of the number are provided in the active region Raa (for example, ten touch points), and it is determined whether the controller 190 may successfully execute the active touch signal (for example, the active touch signal corresponding to the ten touch points). Generally speaking, when the number of touch points exceeds the upper limit, the controller 190 may not operate normally, but if the number of touch points is less than or equal to the upper limit, the controller 190 may operate normally. Therefore, other touch points (such as two touch points) may be provided in the non-active region Rnn subsequently, so that the total number of touch points is greater than the upper limit, and it is confirmed whether the controller 190 may successfully execute the active touch signal (for example, the active touch signals corresponding to the ten touch points located in the active region Raa) or whether it may be operated normally. If the controller 190 may successfully execute the active touch signal or may operate normally, it is determined that the controller 190 may bypass the non-active touch signal and not perform signal processing on the non-active touch signal.

In summary, according to some embodiments, the controller of the touch panel may perform touch signal management, so that only the active touch signal is subjected to a subsequent process. According to some embodiments, it is possible to prevent noise (such as a non-active touch signal) generated by the sensing electrode disposed in the non-active region from interfering with the operation of the touch panel, thereby improving the accuracy of the signal.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A touch panel, comprising an active region and a non-active region in an operating state, the touch panel comprising:
   a flexible element, comprising a plurality of sensing electrodes, disposed in the active region and the non-active region;

a housing, configured to house a first part of the flexible element in the non-active region, wherein a second part of the flexible element in the active region is exposed from the housing; and a controller, for receiving an active touch signal from the plurality of sensing electrodes located in the active region and a non-active touch signal from the plurality of the sensing electrodes located in the non-active region;

wherein the controller manages the active touch signal and the non-active touch signal, so that only the active touch signal is subjected to a subsequent process.

2. The touch panel of claim 1 further comprising:
a positioning element, for determining ranges of the active region and the non-active region.

3. The touch panel of claim 2, wherein the positioning element is an optical sensor.

4. The touch panel of claim 2, wherein the positioning element is a capacitive sensor.

5. The touch panel of claim 2, wherein the positioning element is a resistive sensor.

6. The touch panel of claim 1, wherein the touch panel is rollable.

7. The touch panel of claim 1, wherein the touch panel is foldable.

8. A touch panel operation method, for a touch panel, the touch panel operation method comprising:

receiving an active touch signal and an non-active touch signal, wherein the touch panel comprises an active region and a non-active region in an operating state, and the touch panel comprises a flexible element and a housing configured to house a first part of the flexible element in the non-active region, a second part of the flexible element in the active region is exposed from the housing, the flexible element comprises a plurality of sensing electrodes, the active touch signal is from the plurality of sensing electrodes located in the active region, and the non-active touch signal is from the plurality of sensing electrodes located in the non-active region; and managing the active touch signal and the non-active touch signal, so that only the active touch signal is subjected to a subsequent process.

9. The touch panel of claim 1, further comprising:
a positioning element, configured to detect a relative positional relationship between the housing and the flexible element to determine ranges of the active region and the non-active region.

10. The touch panel of claim 1, further comprising:
a positioning element for determining ranges of the active region and the non-active region, wherein the positioning element is disposed on a display surface of the flexible element.

11. The touch panel of claim 1, further comprising:
a positioning element for determining ranges of the active region and the non-active region, wherein the positioning element is disposed inside the flexible element.

12. The touch panel of claim 1, further comprising:
a positioning element for determining ranges of the active region and the non-active region, wherein the positioning element is disposed on a surface of the housing.

13. The touch panel of claim 1, further comprising:
a plurality of positioning elements for determining ranges of the active region and the non-active region, wherein the touch panel is capable of being drawn out along a first direction, and the plurality of positioning elements are disposed along the first direction.

* * * * *